United States Patent [19]

Van Cleve et al.

[11] 4,350,780

[45] Sep. 21, 1982

[54] POLYURETHANES MADE WITH POLYMER/POLYOLS PREPARED VIA PREFORMED STABILIZERS

[75] Inventors: Russell Van Cleve; George H. Armstrong; Donald W. Simroth, all of Charleston, W. Va.

[73] Assignee: Union Carbide Corporation, Danbury, Conn.

[21] Appl. No.: 178,642

[22] Filed: Aug. 14, 1980

Related U.S. Application Data

[63] Continuation-in-part of Ser. No. 26,576, Apr. 3, 1979, Pat. No. 4,242,249, which is a continuation-in-part of Ser. No. 752,818, Dec. 20, 1976, abandoned.

[51] Int. Cl.³ ................ C08G 18/14; C08G 18/63
[52] U.S. Cl. ................ 521/137; 521/904; 521/914; 528/75; 524/881
[58] Field of Search ............ 528/75; 521/137, 904, 521/914; 260/30.4 R, 33.2 R

[56] References Cited

U.S. PATENT DOCUMENTS

| | | | |
|---|---|---|---|
| Re. 28,751 | 2/1976 | Stamberger | 260/33.2 R |
| 3,304,273 | 2/1967 | Stamberger | 260/2.5 |
| 3,383,351 | 5/1968 | Stamberger | 260/33.2 |
| 3,514,500 | 5/1970 | Osmond et al. | 260/874 |
| 3,523,093 | 8/1970 | Stamberger | 260/2.5 |
| 3,580,880 | 5/1971 | Clarke et al. | 260/29.6 R |
| 3,779,993 | 12/1973 | Kibler et al. | 260/40 R |
| 3,823,201 | 7/1974 | Pizzini et al. | 260/33.2 R |
| 4,021,383 | 5/1977 | Cuscurida et al. | 260/2.5 AM |
| 4,021,384 | 5/1977 | Brader et al. | 260/2.5 AP |
| 4,093,573 | 6/1978 | Ramlow et al. | 260/2.5 BE |
| 4,119,586 | 10/1978 | Shah | 521/137 |

FOREIGN PATENT DOCUMENTS 1052241 12/1966 United Kingdom.
1126025 9/1968 United Kingdom.

OTHER PUBLICATIONS

Saunders et al. Polyurethanes Part II, Interscience (N.Y.) 1964, pp. 84–94.
Kuryla et al. Journ. Cellular Plastics, Mar. 1966, pp. 2–13.
Napper, Jour. Colloid and Interface Soc., vol. 32, No. 1, Jan. 1970, pp. 106–114.
Napper, Trans. Faraday Soc. Nov. 1967, pp. 1701–1711.

Primary Examiner—H. S. Cockeram
Attorney, Agent, or Firm—Paul W. Leuzzi, II

[57] ABSTRACT

This invention relates to polymer/polyols prepared from an ethylenically unsaturated monomer or a mixture of such monomers and characterized by the utilization, in the preparation thereof, of certain preformed stabilizers tailored to the monomer system employed, a method of preparing such polymer/polyols, and to the preformed stabilizers themselves. In general, the stabilizer, compatible with the polyol portion of the polymer/polyol, comprises a copolymer of an anchor portion consisting of an ethylenically unsaturated monomer or mixture of such monomers and a solvatable portion consisting of a propylene oxide polymer having a number average molecular weight of at least 800. The resulting polymer/polyols are stable, fluid, essentially free from scrap and seeds as produced and contain relatively small polymer particles. In accordance with one aspect of this invention, the polymer particles are essentially spherical in shape.

6 Claims, 5 Drawing Figures

Fig. 1.

POLYMER/POLYOL COMPOSITION

| ACRYLONITRILE | 100 | 90 | 80 | 70 | 60 | 50 | 40 | 30 | 20 | 10 | 0 |
|---|---|---|---|---|---|---|---|---|---|---|---|
| STYRENE | 0 | 10 | 20 | 30 | 40 | 50 | 60 | 70 | 80 | 90 | 100 |

D                 C

A                 B

| ACRYLONITRILE | 100 | 90 | 80 | 70 | 60 | 50 | 40 | 30 | 20 | 10 | 0 |
|---|---|---|---|---|---|---|---|---|---|---|---|
| STYRENE | 0 | 10 | 20 | 30 | 40 | 50 | 60 | 70 | 80 | 90 | 100 |

ANCHOR PORTION COMPOSITION

Fig. 2.

POLYMER/POLYOL COMPOSITION

| ACRYLONITRILE | 100 | 90 | 80 | 70 | 60 | 50 | 40 | 30 | 20 | 10 | 0 |
|---|---|---|---|---|---|---|---|---|---|---|---|
| STYRENE | 0 | 10 | 20 | 30 | 40 | 50 | 60 | 70 | 80 | 90 | 100 |

H                 G

E                 F

| ACRYLONITRILE | 100 | 90 | 80 | 70 | 60 | 50 | 40 | 30 | 20 | 10 | 0 |
|---|---|---|---|---|---|---|---|---|---|---|---|
| STYRENE | 0 | 10 | 20 | 30 | 40 | 50 | 60 | 70 | 80 | 90 | 100 |

ANCHOR PORTION COMPOSITION

Fig. 3.

POLYMER/POLYOL COMPOSITION

| ACRYLONITRILE | 100 | 90 | 80 | 70 | 60 | 50 | 40 | 30 | 20 | 10 | 0 |
|---|---|---|---|---|---|---|---|---|---|---|---|
| STYRENE | 0 | 10 | 20 | 30 | 40 | 50 | 60 | 70 | 80 | 90 | 100 |

L   K

I   J

| ACRYLONITRILE | 100 | 90 | 80 | 70 | 60 | 50 | 40 | 30 | 20 | 10 | 0 |
|---|---|---|---|---|---|---|---|---|---|---|---|
| STYRENE | 0 | 10 | 20 | 30 | 40 | 50 | 60 | 70 | 80 | 90 | 100 |

ANCHOR PORTION COMPOSITION

Fig. 4.

POLYMER/POLYOL COMPOSITION

| ACRYLONITRILE | 100 | 90 | 80 | 70 | 60 | 50 | 40 | 30 | 20 | 10 | 0 |
|---|---|---|---|---|---|---|---|---|---|---|---|
| STYRENE | 0 | 10 | 20 | 30 | 40 | 50 | 60 | 70 | 80 | 90 | 100 |

P   O

M   N

| ACRYLONITRILE | 100 | 90 | 80 | 70 | 60 | 50 | 40 | 30 | 20 | 10 | 0 |
|---|---|---|---|---|---|---|---|---|---|---|---|
| STYRENE | 0 | 10 | 20 | 30 | 40 | 50 | 60 | 70 | 80 | 90 | 100 |

ANCHOR PORTION COMPOSITION

Fig. 5.

POLYMER/POLYOL COMPOSITION

| ACRYLONITRILE | 100 | 90 | 80 | 70 | 60 | 50 | 40 | 30 | 20 | 10 | 0 |
|---|---|---|---|---|---|---|---|---|---|---|---|
| STYRENE | 0 | 10 | 20 | 30 | 40 | 50 | 60 | 70 | 80 | 90 | 100 |

| ACRYLONITRILE | 100 | 90 | 80 | 70 | 60 | 50 | 40 | 30 | 20 | 10 | 0 |
|---|---|---|---|---|---|---|---|---|---|---|---|
| STYRENE | 0 | 10 | 20 | 30 | 40 | 50 | 60 | 70 | 80 | 90 | 100 |

ANCHOR PORTION COMPOSITION

POLYURETHANES MADE WITH POLYMER/POLYOLS PREPARED VIA PREFORMED STABILIZERS

CROSS-REFERENCE TO RELATED APPLICATIONS

This application is a continuation-in-part of application Ser. No. 026,576, which was filed on Apr. 3, 1979 and is now U.S. Pat. No. 4,242,249. That application was a continuation-in-part of abandoned application Ser. No. 752,818, which was filed on Dec. 20, 1976.

BACKGROUND OF THE INVENTION

Polymer/polyol compositions suitable for use in producing polyurethane foams, elastomers and the like are known materials. The basic patents in this field are U.S. Pat. No. 3,304,273, 3,383,351 and Re. 28,715 to Stamberger. Such compositions can be produced by polymerizing one or more olefinically unsaturated monomers dissolved or dispersed in a polyol in the presence of a free radical catalyst. These polymer/polyol compositions have the valuable property of imparting to, for example, polyurethane foams and elastomers produced therefrom, higher load-bearing properties than are provided by unmodified polyols.

In addition, U.S. Pat. No. 3,523,093 to Stamberger discloses a method for preparing polyurethanes by reacting a polyisocyanate with a mixture of a polyol solvent medium and a preformed normally solid film-forming polymeric material obtained by polymerization of ethylenically unsaturated monomers. The film-forming polymer may be prepared by various techniques, including polymerizing the monomers in the presence of reactive radical-containing compounds such as alcohols and mercaptans.

The polymer/polyol compositions initially introduced were primarily compositions produced from polyols and acrylonitrile and, to some extent, acrylonitrile-methylmethacrylate mixtures. Such compositions were at least primarily used commercially in producing foams under conditions such that the heat generated during foaming is readily dissipated (e.g.—the foams are of a relatively thin cross-section) or under conditions such that relatively little heat is generated during foaming. When the heat is not readily dissipated, the foams tend to scorch (discolor).

U.S. Pat. No. 4,208,314 provides an improved process for forming polymer/polyols from acrylonitrile-styrene monomer systems which includes, in general, maintaining a low monomer concentration throughout the reaction mixture during the process. The novel polymer/polyols produced can be converted to low density, water-blown polyurethane foams having reduced scorch in comparison to all acrylonitrile, and acrylonitrile-methylmethacrylate polymer/polyols. However, the stability of the polymer/polyols decreases with increasing styrene to acrylonitrile ratios. Further, the discoloration (scorch) of the resulting foams still presents some problems, particularly when the polymer composition contains a relatively high acrylonitrile to styrene ratio.

Still further, U.S. Pat. No. 4,104,236 to Simroth discloses additional and substantial improvements in forming polymer/polyols. This allows the optimization of the polymer content and the usable monomer ratios for a given polyol.

U.S. Pat. No. 4,172,825 discloses further improvements in the formation of polymer/polyols. As discussed therein, polymer/polyol compositions exhibiting outstanding properties can be made by utilizing, in the formation of the polymer/polyols, a specific type of peroxide catalyst, namely t-alkyl peroxyester catalysts. By the utilization of this specific type of catalyst, polymer/polyols can be produced on a commercial basis with outstanding properties such as filterability in processing yet which allows either the polymer or the styrene content to be increased. Also, polymer/polyols can be produced on a commercial scale with polyols having a molecular weight lower than have been used prior to this invention.

Despite these improvements, there is still room for further refinement. Thus, in the slabstock foam area, the problem of scorch presents a barrier to the use of acrylonitrile-containing polymer/polyols where the buns have a relatively large cross-section. It would be desirable to, in effect, be capable of providing acrylonitrile copolymer polymer/polyols that would be sufficiently low in acrylonitrile content to provide reliable assurance that the resulting buns would be even less subject to scorch. Achievement of this objective requires the utilization of relatively high levels of styrene or other comonomers, so that the acrylonitrile content is about 30 to 40 percent of the monomer system used or even lower. While such polymer/polyols can be produced with certain limitations by prior techniques, the production is not as commercially trouble-free as is desired.

More particularly, the production of polymer/polyols on a large commercial scale with the economy needed places practical limitations on the minimum ratio of acrylonitrile to styrene or other comonomer used in the monomer system, the minimum polyol molecular weight and the maximum polymer content when prior techniques are employed. Commercial production thus requires that the resulting polymer/polyols have relatively low viscosities so that processing in the production equipment can be economically carried out. Further, the stability resulting must be sufficient to allow operation without plugging or fouling of the reactors as well as allowing for relatively long term storage.

The polymer/polyols must also be capable of being processed in the sophisticated foam equipment presently being used. Typically, the prime requirement is that the polymer/polyols possess sufficiently small particles so that filters, pumps and the like do not become plugged or fouled in relatively short periods of time.

While somewhat simplified, the commercial processability of a particular polymer/polyol comes down to its viscosity and stability against phase separation. Lower viscosities are of substantial practical and economic significance due to the ease of pumping and metering as well as ease of mixing during the formation of polyurethanes. Stability is of prime consideration in insuring that the polymer/polyols can be processed in commercial production equipment without the necessity of additional mixing to insure homogeneity.

It has been recognized that the stability of polymer/polyols requires the presence of a minor amount of a graft or addition copolymer which is formed in situ from the polymer and polyol.

With regard to graft copolymer stabilizers, a number of literature references have observed large differences in grafting efficiency between the use of peroxides such as benzoyl peroxide and azobis-isobutyronitrile in certain monomer-polymer systems. In general, the conceptual thrust is that the use of peroxide catalysts should improve the stability inasmuch as this type of catalyst produces a relatively greater amount of the graft specie.

Others have noted no marked differences in grafting efficiency. In the *Journal of Cellular Plastics*, March, 1966, entitled "Polymer/Polyols; A New Class of Polyurethane Intermediates" by Kuryla et al., there is reported a series of precipitation experiments run to determine any marked differences in the polymer/polyols produced by either benzoyl peroxide or azobisisobutyronitrile when used as the initiators in the in situ polymerization of acrylonitrile in a propylene oxide triol having a theoretical number average molecular weight of about 3000. The data indicated no significant differences between the polymers isolated, and no marked "initiator effect" was observed.

With regard to addition copolymer stabilizers, efforts in the polymer/polyol field have been concerned with the incorporation of additional amounts of unsaturation to that inherently present in the polyoxalkylene polyols typically used in forming polymer/polyols. U.S. Pat. Nos. 3,652,639 and 3,823,201 and Great Britain No. 1,126,025 all utilize this approach.

None of the above patents recognize the utility of adding a tailored, preformed stabilizer in producing polymer/polyols.

In general, a substantial amount of addition effort has been directed towards dispersion polymerization in organic liquids. This involves the polymerization of a monomer dissolved in organic liquid to produce insoluble polymer dispersed in the liquid as a continuous phase in the presence of an amphipathic graft or block copolymer as the dispersant (stabilizer). According to a recent text, "Dispersion Polymerization in Organic Media", edited by K. E. J. Barrett, John Wiley & Sons, copyright 1975, the development of techniques for the preparation of dispersions of polymers of controlled particle size in organic liquids has been largely motivated by the requirements of the surface coatings industry. The function of the dispersant or stabilizer in a sterically-stabilized colloidal dispersion is to provide a layer of material solvated by the dispersion medium on each particle surface. Every particle is thus surrounded by a tenuous cloud of freely-moving polymer chains which is, in effect, in solution in a continuous phase. This layer prevents the particles from coming into direct contact and also insures that, at the distance of closest approach of the two particles, the attraction between them is so small that thermal energy renders contact reversible.

The most successful type of dispersant devised for use in dispersion polymerization, according to Barrett, has been based on a block or graft copolymer which consists of two essential polymeric components—one soluble and one insoluble in the continuous phase. The dispersant may be either preformed or formed in situ. When formed in situ, a "precursor" is used, i.e., a soluble polymeric component that is introduced into the organic liquid serving as the polymerization medium. The monomer system being polymerized will react with the soluble polymeric component during polymerization to form, in situ, a graft or addition copolymer dispersant. When an addition copolymer dispersant is to be produced, the source of the soluble polymeric component is unsaturated and is termed a "macromonomer". The main requirement for what is termed the "anchor" portion is that it be insoluble in the dispersion medium, but its effectiveness may be greatly enhanced if it has some specific affinity for the dispersed polymer. The criterion of insolubility of the anchor portion also defines, in practice, the minimum size of the soluble portion. For a polymer to be sufficiently insoluble in the dispersion medium, the molecular weight usually has to be of the order of 1000 or greater. The soluble chain attached to such an anchor portion must be at least of similar molecular weight, otherwise a stable micellar solution of dispersant cannot be formed in the dispersion medium; and precipitation occurs. The minimum molecular weight of the soluble component must therefore be at least 500 to 1000, which is considerably greater than the minimum requirement for an effective steric barrier.

Based upon this technology, a large number of patents have been issued. The Barrett text lists some 200 issued United States and foreign patents. Yet, despite this considerable body of technology, applicants are unaware of any attempts prior to the present invention to prepare polymer/polyols by employing preformed stabilizers. Indeed, the prior efforts in dispersion polymerization have been directed to the use of organic liquids as dispersion mediums which have extremely low viscosities, e.g.—typically no more than a few centipoises at 25° C. The theoretical considerations discussed in Napper, *Journal of Colloid and Interface Science*, 32 pages 106–114 (1970), may well account for the fact that preformed stabilizers have not been used heretofore to stabilize polymers/polyols, despite the recognition that the stability of polymer/polyols requires the presence of a graft or addition copolymer which is formed in situ in conventional polymer/polyol from the polymer and polyol. Thus, the Napper article leads to the conclusion that stabilization would not be effective if the solvatable portion has a chemical composition identical to the polymerization medium.

OBJECTS

It is an object of the present invention to provide a process for producing polymer/polyol compositions in which the range of commercially useful process parameters considered critical can be broadened.

A further object provides a process for producing polymer/polyol compositions which allows the production, on a commercial scale, of polymer/polyols with at least one parameter which prevented the commercial production using prior techniques.

A still further object is to provide polymer/polyol compositions which may be used to produce low density, water-blown polyurethane in areas such as slab foam stock foams which are characterized by the substantial absence of scorch or off-color.

Yet another object of this invention is to provide a versatile and economic process for producing polymer/polyol compositions.

A further object provides preformed stabilizers which allow the economic, commercial production of polymer/polyols.

Yet another specific object, in accordance with one aspect of this invention, lies in the provision of polymer/polyol compositions utilizing preformed stabilizers which are capable of conversion to polyurethane foam products without any alteration of the foam formulation due to the inclusion of the stabilizer.

Still another object of this invention is to provide, in accordance with one aspect of the invention, polymer/- polyols wherein the polymer particles are essentially spherical in shape.

Other objects and advantages of the present invention will become apparent in the following description, and in the drawings in which:

FIG. 1 is a tie-line diagram showing the anchor portion compositions of the preformed stabilizer of the present invention useful in forming polymer/polyols (line AB) when the polymer portion is formed by polymerizing from about 30/70 to about 60/40 acrylonitrile/styrene (line CD);

FIG. 2 is a tie-line diagram and illustrates the preferred anchor portion compositions (line EF) for forming the polymer/polyols described in connection with FIG. 1 (indicated by line GH);

FIG. 3 is a tie-line diagram and shows the anchor portion compositions of the preformed stabilizer of this invention useful in forming polymer/polyols (line IJ) when the polymer portion is formed by polymerizing from about 0/100 to about 30/70 acrylonitrile/styrene (line KL);

FIG. 4 is a tie-line diagram illustrating the preferred anchor portion compositions (line MN) for forming the polymer/polyols described in connection with FIG. 3 (line OP), and, FIG. 5 is a tie-line diagram showing the anchor portion compositions of the stabilizers of this invention useful in forming polymer/polyols (line QR) when the polymer portion is formed by polymerizing from about 60/40 to about 100/0 acrylonitrile/styrene (line ST).

SUMMARY OF THE INVENTION

In general, the present invention is predicated on the discovery that improved polymer/polyols can be prepared by utilizing certain preformed dispersants or stabilizers. These polymer/polyols, in contrast to polymer/polyols made by prior techniques, are characterized by stability satisfactory to allow commercial production and use of one or more of the following characteristics: (1) higher amounts of styrene or other comonomer when acrylonitrile copolymer polymer/polyols are being prepared, (2) higher polymer contents or (3) the use of lower molecular weight polyols. The particular dispersant employed and the concentration utilized vary with respect to the monomer system used in preparing the polymer/polyols.

More particularly, the preformed dispersant or stabilizer used comprises a polymeric anchor portion tailored to the monomer system being utilized and a solvatable portion compatible with the polyol. In contrast to the prior efforts in dispersion polymerization in which the primary focus is directed to designing stabilizers based upon the relative solubility and insolubility of the solvatable and anchor portions in the reaction medium, the present invention is based in part on the discovery that enhanced stability of polymer/polyols requires that the polymeric anchor be varied in relation to changes in the monomer system being utilized in producing the dispersed phase (i.e.-the polymer).

The stabilizers of the present invention are characterized by extremely high viscosities in comparison to viscosities of useful polymer/polyols. Thus, the stabilizers typically possess viscosities well in excess of 40,000 centipoises at 25° C. as compared to polymer/polyols which have viscosities below 40,000 centipoises.

The present invention is thus directed to a process for producing fluid, stable polymer/polyol compositions which comprises polymerizing, in the presence of a free radical catalyst, a reaction mixture comprising:

(1) from about 10 to about 40 weight percent of an ethylenically unsaturated monomer or a mixture of such monomers, (2) from 60 to about 90 weight percent of a normally liquid polypropylene oxide polyol having a number average molecular weight of at least about 400 and a hydroxyl number of from about 20 to about 280, said weight percents of the monomer or monomer mixture and polyol being based on the total weight thereof and (3) a performed stabilizer compatible with said polyol and present in an amount sufficient to stabilize the resulting polymer/polyol, said stabilizer being a copolymer comprising:
  (a) an anchor portion consisting of a polymer of the monomer or mixture of monomers as defined in (1) chemically bonded to
  (b) a solvatable portion consisting of a propylene oxide polymer having a number average molecular weight of at least about 800.

The present invention is likewise directed to a preformed copolymeric stabilizer for polymer/polyol compositions comprising:

(a) an anchor portion consisting of a polymer of an ethylenically unsaturated monomer or a mixture of such monomers chemically bonded to
(b) a solvatable portion consisting of a propylene oxide polymer having a number average molecular weight of at least 800 and being a member selected from the group consisting of:
  (1) a polyoxypropylene polyol consisting essentially of the reaction product of a saturated polyhydric starter and propylene oxide or propylene oxide and ethylene oxide,
  (2) the reaction product of a propylene oxide polymer and an organic compound capable of reaction with the propylene oxide polymer to provide a reaction product with terminal, ethylenic unsaturation, with the proviso that said reaction product has on the average, terminal ethylenic unsaturated group on only one end and
  (3) the reaction product of a propylene oxide polymer and an organic compound containing a group enhancing hydrogen abstraction, said stabilizer having a viscosity in excess of 40,000 centipoises at 25° C.

DETAILED DESCRIPTION

Conceptually, the monomers used in preparing the polymer/polyols can comprise any ethylenically unsaturated monomer or monomers. Suitable monomers are disclosed in the Stamberger patents, previously referred to. Representative useful monomers include acrylonitrile, styrene, vinyl acetate, ethyl acrylate, methyl methacrylate and acrylic acid. The selection of the monomer or monomers used will depend on considerations such as the relative cost of the monomers and the product characteristics required for the intended application.

It is preferred to utilize acrylonitrile or mixtures thereof with a comonomer. When monomer mixtures are employed, it is preferred to maintain a minimum of about 5 to 15 percent by weight acrylonitrile in the system. Styrene will generally be preferred as the comonomer, but methyl methacrylate or other monomers may be employed in place of part or all of the styrene. To provide polymer/polyols for use in applications where minimal scorch is desired, the acrylonitrile content of the monomer mixture used should be less than about 40 percent by weight, preferably less than about 30 percent.

The polymer content of the polymer/polyol can vary within wide limits, depending upon the requirements of the anticipated end use application. Consequently, it will in general be desirable to form the polymer/polyols with as high a polymer content as will provide the desired viscosity and stability properties. In general, this will vary from about 10 to about 60 percent, based upon the weight of the polymer/polyol. Lower polymer contents may, of course, be utilized; however, there is typically no incentive to use monomer amounts which will result in polymer contents lower than about 10 percent by weight because of the lower conversions and the economic penalty due to the increased throughput involved. On the other hand, it will generally be undesirable to utilize polymer contents in excess of about 40 percent by weight or so. While useful polymer/polyols with higher polymer contents certainly can be made, such polymer/polyols may possess viscosity and stability characteristics which are commercially undesirable.

The resulting polymer/polyols may, if desired, be blended with conventional polyols or the like to reduce the polymer content to the level required for the particular end use application. Blends in which the resulting polymer content is as low as 4 percent of the total weight of the blend or even less are useful.

With respect to the polyol constituent, this comprises poly(oxypropylene) glycols, triols and higher functionality polyols. Such polyols include poly(oxypropyleneoxyethylene) polyols: however, desirably, the oxyethylene content should comprise less than about 50 percent of the total and, preferably, less than about 20 percent. The ethylene oxide can be incorporated in any fashion along the polymer chain. Stated anothe way, the ethylene oxide can be either incorporated in internal blocks, as terminal blocks, or may be randomly distributed along the polymer chain. As is well known in the art, the preferred polyols herein do contain varying amounts of unsaturation. The extent of unsaturation typically involved does not affect in any adverse way the formation of the polymer/polyols in accordance with the present invention.

For the purposes of this invention, useful polyols should have a number average molecular weight of about 400 or greater, the number average being used herein being the theoretical, hydroxyl number derived value. The true number average molecular weight may be somewhat less, depending upon the extent to which the true molecular functionality is below the starting or theoretical functionality.

The polyols employed can have hydroxyl numbers which vary over a wide range. In general, the hydroxyl numbers of the polyols employed in the invention can range from about 20 and lower, to about 280 and higher. The hydroxyl number is defined as the number of milligrams of potassium hydroxide required for the complete hydrolysis of the fully phthalated derivative prepared from 1 gram of polyol. The hydroxyl number can also be defined by the equation:

$$OH = \frac{56.1 \times 1000 \times f}{m.w.}$$

where

OH = hydroxyl number of the polyol f = functionality, that is, average number of hydroxyl groups per molecule of polyol m.w. = molecular weight of the polyol.

The exact polyol employed depends upon the end use of the polyurethane product to be produced. The molecular weight or the hydroxyl number is selected properly to result in flexible or semi-flexible foams or elastomers when the polymer/polyol produced from the polyol is converted to a polyurethane. The polyols preferably possess a hydroxyl number of from about 50 to about 150 for semi-flexible foams and from about 25 to about 70 for flexible foams. Such limits are not intended to be restrictive, but are merely illustrative of the large number of possible combinations of the above polyol coreactants.

While not preferred, any other type of known polyol may also be used. Among the polyols which can be employed are one or more polyols from the following classes of compositions, known to those skilled in the polyurethane art:

(a) Alkylene oxide adducts of non-reducing sugars and sugar derivatives;

(b) Alkylene oxide adducts of phosphorous and polyphosphorus acids;

(c) Alkylene oxide adducts of polyphenols;

(d) The polyols from natural oils such as castor oil, and the like;

(e) Alkylene oxide adducts of polyhydroxyalkanes other than those already described herein.

Illustrative alkylene oxide adducts of polyhydroxyalkanes include, among others, the alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyol is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novalac resins; condensation products of various phenolic compounds and acrolein; the simplest members of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis (hydroxyphenol)ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

It should be appreciated that blends or mixtures of various useful polyols may be used if desired. With polyols other than the preferred type, useful monomer contents and monomer or monomers may vary somewhat. Similarly, it may be desirable or even necessary to modify the stabilizer of this invention when such other polyols are used. This can be accomplished by following the criteria discussed hereinafter in connection with the stabilizers used for the preferred polyols.

Regarding the catalyst employed to form the polymer/polyols, any free radical catalyst, from the conceptual standpoint, may be utilized. Useful catalysts include the t-alkyl peroxyester catalysts described in the hereinbefore mentioned, copending Van Cleve et al. application. As described therein, useful catalysts must have a satisfactory half-life within the temperature ranges used in forming the polymer/polyol compositions, i.e.—the half-life should be about 25 percent or less of the residence time in the reactor at a given temperature. Representative examples of useful catalyst species include t-butyl peroxy-2-ethylhexanoate, t-butylperpivalate 2,5-dimethyl-hexane-2,5-di-per-2-ethyl hexoate, t-butylperneodecanoate, t-butylperbenzoate and di-t-butylphthalate. It is, however, preferred to employ azo catalysts, with azobis-isobutyronitrile being preferred. In general, it is believed that the azo catalyzed polymer/polyols process better in the preparation of urethane flexible foams. Thus, the use of such catalysts will generally provide lower acidity in the resulting polymer/polyols as well as freedom from the odor characteristic of products formed with peroxyester catalysts which might be objectionable to some users.

The catalyst concentration employed is not critical and can be varied within wide limits. As a representative range, the concentration can vary from about 0.1 to about 5.0 weight percent or even more, based upon the total feed to the reactor. Up to a certain point, increases in the catalyst concentration result in increased monomer conversion; but further increases do not substantially increase conversion. The particular catalyst concentration selected will usually be an optimum value considering all factors, including costs.

The polymer/polyols of the present invention are preferably produced by utilizing the process set forth in the copending Priest application, identified herein. In accordance with that process, a low monomer to polyol ratio is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

The temperature range is not critical and may vary from about 100° C. to about 140° C. or perhaps greater, the preferred range being from 115° C. to 125° C. As has been noted herein, the catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.—a stirred flask or stirred autoclave). The reactors of this type keep the reaction mixture relatively homogeneous and so prevent localized high monomer to polyol ratios such as occur in certain tubular reactors, e.g.—in the first stages of "Marco" reactors when such reactors are operated with all the monomer added to the first stage.

The utilization of the Priest process is preferred since this allows the preparation of polymer/polyols with a wide range of monomer compositions, polymer contents and polyols that could not be otherwise prepared with the necessary requisite stability. However, whether the utilization of the Priest process is essential depends upon whether the process parameters are such that a satisfactory polymer/polyol can be prepared without using this process.

The polymer/polyols of the present invention comprise dispersions in which the polymer particles (the same being either individual particles or agglomerates of individual particles) are relatively small in size and, in the preferred embodiment, are all essentially less than about one to three microns. However, when high contents of styrene are used, the particles will tend to be larger; but the resulting polymer/polyols are highly useful, particularly where the end use application requires as little scorch as possible. In the preferred embodiment, essentially all of the product (viz.—about 99% or more) will pass through the filter employed in the filtration hinderance (filterability) test that will be described in conjunction with the Examples. This insures that the polymer/polyol products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50 percent of the product passes through the filter. Some applications may also find useful products in which only about 20 percent or even less passes through the filter. Accordingly, the polymer/polyols of the present invention desirably contemplate the products in which only 20 percent pass through the filter, preferably at least 50 percent, and most preferably, essentially all.

Indeed, it should be appreciated that the filtration hindrance test presents the most rigorous test of polymer/polyol stability; and, accordingly, while satisfactory filtration hindrance characteristics are certainly to be preferred, commercially stable polymer/polyols for a variety of applications may be satisfactorily defined by their viscosity and centrifugible solids level (this test being also described in connection with the Examples). Thus, polymer/polyols are considered stable as long as the viscosity is no more than about 5,000 cps. at 25° C. and the centrifugible solids are less than about 10%, preferably less than 5%.

In accordance with the present invention, the preparation of the polymer/polyols is carried out in the presence of a preformed stabilizer tailored to the monomer system being employed. The stabilizer, in a functional sense, is present in an amount sufficient to insure that satisfactory stabilization wil result, viz.—the desired filtration hindrance, centrifugible solids level and viscosity are provided.

According to one aspect of the present invention, the solvatable constituent of the stabilizer is formed from a polypropylene oxide macromonomer having terminal monoethylenic unsaturation. The minimum number average molecular weight of the macromonomer should be at least about 800, preferably at least about 1800 and, most preferably at least about 2600. Macromonomers with molecular weights up to 5000 or even more can be utilized if desired.

The macromonomer can be suitably prepared by condensing a polypropylene oxide material having hydroxyl functionality with any organic compound capable of providing the desired monoethylenic unsaturation. Monols, diols and triols are preferred; however, conceptually, tetrols and higher functionality polyols could also be employed. As is known, polypropylene oxide materials of this type can be prepared by forming adducts of propylene oxide with lower molecular weight monols, diols, triols and the like such as, for example, glycerine, dipropylene glycol, butanol and the like. The macromonomer may contain minor amounts of other materials. Thus, poly(oxypropylene-oxyethylene) materials containing up 10 to 20 weight percent oxyethylene or so may be suitably used. The condensation reaction to form the macromonomer is known and can be carried out, for example, in an inert solvent such as benzene at elevated temperatures in the range of 80° C. to 115° C.

Insofar as the constituent providing the monoethylenic terminal unsaturation is concerned, any compound which will condense with the polypropylene oxide material may conceptually be employed. However, in practice, the compound selected should possess unsaturation of a type reactive in vinyl polymerization. For this reason, compounds containing allylic unsaturation show no advantage; in fact, the resulting stabilizers have been found to be ineffective. As representative examples, the desired unsaturation may be imparted by utilizing either acrylic acid or methacrylic acid. Use of these two compounds has not demonstrated any differences in utility of any particular significance. Processwise, the unsaturation can be provided by using conventional transesterification or ester interchange techniques. In addition, the unsaturation could be imparted by employing maleic anhydride or the like. A further useful embodiment can be provided by reacting toluene diisocyanate with the propylene oxide polymer to form an intermediate product which is thereafter reacted with hydroxyethylacrylate to form the macromonomer. The use of these latter examples provides a process advantage in that the filtration step needed when an acrylate is formed is obviated.

When diols or higher functionality polyols are employed, it is important that the reaction forming the macromonomer be carried out in a fashion designed to react away, on the average, only one of the hydroxyl groups of the polyol. The utilization of stabilizers formed from macromonomers having on the average significantly more than one end of the chain capped with monoethylenic unsaturation have proved to be relatively ineffective in stabilizing polymer/polyols.

The dispersants or stabilizers may then be prepared by grafting the monomer of monomers used as the anchor portion to the macromonomer. As used herein, the term "grafting" includes the species formed by free radical addition polymerization as well as the species formed via hydrogen abstraction. The reaction may be carried out in any inert solvent. Representative examples include toluene, benzene, ethylbenzene and a mixture of toluene and methylethylketone. The solids concentration (i.e.—total weight of the macromonomer and monomer or monomers for the anchor portion) can vary within wide limits; and it is suitable to carry out the formation of the stabilizer with a solids concentration of from about 10 to 60 percent, based upon the total weight of the solids and solvent, preferably about 10 to 40 percent, most preferably 30 to 40 percent.

The weight ratio of the macromonomer to the monomer or monomers used to form the anchor portion can also be varied within a wide range. However, the ratio selected will generally influence the compositional character of the dispersant formed due to the effects on the type of grafting reaction which predominates. It will accordingly be generally preferred to utilize at least about 50 percent of the macromonomer, and it is particularly preferred to use a solids concentration in which the macromonomer constitutes about 60 to 70 percent of the total with relatively high molecular weight macromonomers and about 80 percent or so with lower molecular weight macromonomers.

It is preferred to select the parameters so that a homogeneous stabilizer results as opposed to one which coacervates (viz.—separates into layers). The advantage of having a homogeneous product to handle instead of one which has layers and must be mixed before each use is apparent. Whether the product coacervates or not is believed to be dependent upon the extent of grafting. For a given catalyst the amount of the macromonomer used in relation to that of the vinyl monomer or monomers willl influence this result.

The catalyst used, and the concentration, can suitably be the same as those previously discussed in connection with the formation of polymer/polyols. The selection of the catalyst will also, to some extent, influence the type of grafting reaction which will predominate. For example, the use of a peroxide catalyst has been found to accentuate grafting via hydrogen abstraction.

In any instance, grafting via both hydrogen abstraction and vinyl polymerization will take place; and the resulting stabilizer will accordingly be a mixture of various compounds. The exact product mixture is not of particular significance. Indeed, the mixture will typically also include unreacted macromonomer and vinyl monomer or monomers in addition to the various grafted species.

With respect to use of the stabilizers in connection with forming polymer/polyols, the resulting crude reaction stabilizer mixture may be either added directly to the polyol or separation of the solvent and/or unreacted materials may be effected. For example, the unreacted macromonomer in the crude product may be extracted by utilizing a solvent such as hexane. Addition of the stabilizer in the solvent in which it is formed is a highly advantageous processing technique, allowing easier dissolution into the polyol. The solvent may then be stripped out, if desired, by conventional techniques.

To provide effective stabilization, it has been found that the stabilizer should be compatible with the polyol being employed so that a homogeneous mixture is provided. The resulting mixture, visually, may be either a clear solution or opaque depending upon the particular composition of the stabilizer. However, if solids are visually detectable in the resulting system, the use of a stabilizer will typically provide, at best, little stabilizing effect.

The crude stabilizer may be employed, without any refinement or processing other than, if desired, the stripping out of the solvent in which the stabilizer was prepared. The amount of the crude stabilizer which may be employed should be sufficient to achieve the desired stability. It has been found that a small amount (e.g.— about 0.2%, based upon the weight of the polymer/polyol) provides a dramatic effect on at least some of the physical properties of the polymer/polyol in comparison to the preparation of the same polymer/polyol without the stabilizer. Typically, this effect is evident from a reduction in the viscosity as well as increased stability as indicated by a reduction of the quantity of centrifugible solids. Indeed, insofar as these properties are concerned, the addition of 0.4 weight percent of stabilizer in certain cases provides properties equivalent to those obtained by employing 1.4 weight percent.

It is, however, preferred to use an amount of stabilizer which is sufficient to provide the desired greater stability as indicated by filtration hindrance characteristics; and achieving superior filtration hindrance will generally require the addition of an amount of stabilizer in excess of that required to achieve satisfactory viscosity and centrifugible solids characteristics. Accordingly, it will generally be desirable to add from about 1 to about 5 percent or even more stabilizer, based upon the weight of the polymer/polyol. Larger amounts could, of course, be employed but there will generally be no functional incentive to use excessive amounts.

In accordance with a still further aspect of the present invention, the acrylonitrile copolymer polymer/polyols obtained using the stabilizers of the present invention have particles whch are spherical in shape. This is achieved by use of the stabilizers of the present invention as well as employing a monomer system in which the styrene or other comonomer is present in amounts in excess of about 40 percent by weight.

In marked contrast to prior efforts in stabilizing polymer dispersions in various organic liquids wherein the primary emphasis was placed on the relative insolubility of the anchor portion in the liquid, as has been alluded to previously, it has been discovered that a further factor must be considered. More specifically, it has been found that the anchor portion of the stabilizers of the present invention must be coordinated with the type of monomer or monomers used to form the polymer portion of the polymer/polyol. Conceptually, it is theorized that effective stabilization requires a careful balance between the solvatable portion and the anchor portion of the stabilizer. If the solvatable portion dominates, it is believed that the anchor portion will be, in effect, pulled into solution thereby losing the contact with the polymer particles which is essential for optimum stability. On the other hand, if the anchor portion dominates, it is believed that the solvatable portion will not provide the required barrier for stabilization. In this application, the terminology "balanced stabilizer" refers to a stabilizer having the careful balance between the solvatable and anchor portions which has been discussed herein.

Considering this aspect more fully some of the vinyl monomers useful in forming polymer/polyols are not solvents for their polymers (e.g.—acrylonitrile) whereas other useful monomers (e.g.—styrene) are solvents for their polymers. The present invention is predicated, in part, on the discovery that effective stabilization requires an anchor portion tailored in composition to the solvency, or lack thereof, of the monomer or monomers used for forming the dispersed polymer portion of the polymer/polyol.

Thus, in accordance with a preferred embodiment of the present invention, the anchor portion is formed from at least two monomers, one of which is not a solvent for its polymer and one which is. Further, the respective monomer weight ratios used are preferably maintained within the range of from about 30/70 to about 80/20 (weight ratio of monomer which is not a solvent to the amount of monomer which is). The range of useful monomer ratios to form the anchor within this range will then be at least principally dependent upon the solvency characteristics of the monomer or monomers being used to form the polymer portion.

In the ensuing discussion for sake of simplicity, the monomer ranges for the anchor portion will be set forth in terms of acrylonitrile to styrene ratios useful in forming polymer/polyols from a monomer system of acrylonitrile and/or styrene. It should, however, be appreciated that the same principles are also applicable to other monomer systems and to anchor portions formed from other monomers. When the polymer portion of the polymer/polyol is formed by polymerizing, by weight, a monomer system of from about 30/70 to about 60/40 acrylonitrile/styrene, optimum stabilization requires that the anchor portion have a composition within line AB of FIG. 1, preferably within line EF of FIG. 2. An anchor portion of 30/70 acrylonitrile/styrene is particularly preferred, especially for 40/60 and 50/50 acrylonitrile/styrene monomer systems.

As the amount of styrene in the monomer system is increased above 70 percent (i.e.—0/100 to 30/70), the anchor portion should have a composition within line IJ of FIG. 3, a composition within line MN of FIG. 4 being preferred. For use with 20/80 and 30/70 acrylonitrile/styrene monomer systems, an anchor portion composition formed from 50/50 acrylonitrile/styrene is preferred. On the other hand, with increasing amounts of acrylonitrile (i.e.—60/40 to 100/0, more particularly, 60/40 to 80/20), useful anchor portions can be formed from a composition defined by line QR of FIG. 5.

It should be appreciated that the exemplary monomer weight ratios set forth do not present absolute limits. Rather, these ratios provide a representative range in which effective stabilization can be achieved. Some experimentation within the general concept may be needed to provide an optimum stabilization effect for a particular monomer system. Indeed, as can be seen from the ranges previously set forth for the anchor portions, there is some overlap. Thus, as one example, the lower limit of the high styrene range (i.e.—30/70) polymer/polyols coincides with the upper limit of the intermediate range polymer/polyols. This coincidence causes an overlap in the sense that the useful anchor portion ratios for a 30/70 acrylonitrile/styrene polymer/polyol determined from the intermediate range is from 30/70 to 80/20 (line AB of FIG. 1) while the determination from the high styrene range polymer/polyols would indicate useful anchor portions of 30/70 to 50/50 (line IJ of FIG. 3). There is a similar coincidence at the upper limit of the intermediate range polymer/polyols as can be seen by comparing FIGS. 3 and 5.

The indicated useful anchor portion ranges at these points of coincidence should not be interpreted individually; rather, these ranges should be considered together. Accordingly, the overall interpretation is that, in the intermediate range where significant relative amounts of both acrylonitrile and styrene are present, the widest latitude for the ratio of the monomers used for the anchor can be employed. However, as either the styrene or acrylonitrile in the monomer system used increases to a disproportionate level, the ratio of useful monomers for the anchor correspondingly becomes narrower.

For this reason, as the amount of styrene in the monomer system being used approaches 70%, the range of the more useful anchor portion compositions will correspond to 30/70 to 50/50. Employing anchor portions with compositions in the range of 50/50 to 80/20 will decrease the effectiveness of the resulting stabilizers somewhat. Similarly, as the amount of acrylonitrile in the monomer system approaches 60%, the range of the more useful anchor portions will correspond to 50/50 to 80/20. Stabilization using anchor portions having 30/70 to 50/50 compositions will generally be less effective than anchors having acrylonitrile contents in excess of 50%.

The principal thrust of this preferred embodiment of this invention is thus that the anchor portion should be formed from at least two monomers, one of which is a solvent for its polymer and one of which is not; and, further, the relative monomer weight ratio utilized in forming the anchor portion must be tailored to the monomer system being used in forming the polymer/polyol. This also serves to illustrate the greater flexibility of this embodiment as compared to the precursor technique. As is apparent, utilizing a precursor necessitates that the anchor portion will be identical in composition to the polymer portion of the polymer/polyol being prepared. Precursors are thus only potentially useful in the range where the effective anchor fortuitously happens to match the useful composition required for the particular monomer system being employed. Moreover, while the reasons are not fully understood, a preformed stabilizer has been found to provide significantly improved stabilization in relation to stabilization achieved by a precursor technique.

It should also be appreciated that the more significant improvements in stability of the polymer/polyols in accordance with the present invention are achieved when one or more of the following parameters are present: (1) a relatively high styrene or other comonomer content (i.e.—70% or more) in the acrylonitrile-comonomer system, (2) a relatively high monomer content (i.e.—30% or more) and (3) a relatively low polyol molecular weight (i.e.—less than about 2000 or so). If these general parameters are not exceeded, satisfactory stabilization will generally be inherently achieved without the necessity of employing any additional technique for stabilization such as the present invention.

The present invention will accordingly find its more important utility in situations where one or more of the above-identified parameters must be utilized to form a polymer/polyol for the particular end use application. Thus, where an application requires a relatively scorch-free product such as in slab stock foam, this may be achieved by forming a polymer/polyol with reduced amounts of acrylonitrile (i.e.—less than about 40%, preferably less than 30%). Indeed, if desired, relatively stable all-styrene polymer/polyols may be formed. Similarly, where high modulus characteristics are required, the present invention allows production of stable polymer/polyols from monomer contents of 30% or more. Still further, stable polymer/polyols can be formed using polyols having molecular weights down to about 400 or so with relatively high monomer contents (up to about 37%).

The appropriate limits for the parameters capable of being used to form a stable polymer/polyol will, of course, depend on the particular stability requirements as well as the interrelationship of the parameters. Thus, when a particular acrylonitrile monomer system is being used, the maximum monomer content that may be employed decreases somewhat as the molecular weight of the polyol decreases. As a specific example, when using a 20/80 acrylonitrile/styrene monomer system, stable polymer/polyols can be made with 18% polymer content in a 3000, but not lower, molecular weight polyol. Similarly, when the objective is to utilize as high a monomer content as is possible, the particular useful maximum will be determined by the acrylonitrile/styrene or other comonomer ratio of the monomer system needed and the molecular weight of the polyol being utilized. The maximum useful polymer content will generally decrease somewhat with decreasing molecular weights of the polyol or relatively high styrene (or other comonomer) to acrylonitrile ratios. Satisfactorily stable polymer/polyols of about 40% polymer or so can be made with a 40/60 monomer system and a 3000 molecular weight polyol.

The situation is the same when low molecular weight polyols are used. Thus, whether a stable polymer/polyol can be made in a particular polyol will depend on the other two parameters desired. The present invention allows formation of stable polymer/polyols in polyols of 400 molecular weight at 37% polymer content with a 50/50 monomer system.

The present invention also provides a method for producing polyurethane products by reacting: (a) a polymer/polyol composition of this invention, (b) an organic polyisocyanate, and (c) a catalyst for the reaction of (a) and (b) to produce the polyurethane product, and, when a foam is being prepared, a blowing agent and a foam stabilizer. The reaction and foaming operations can be performed in any suitable manner, preferably by the one-shot technique.

The organic polyisocyanates that are useful in producing polyurethane products in accordance with this invention are organic compounds that contain at least two isocyanato groups. Such compounds are well known in the art. Suitable organic polyisocyanates include the hydrocarbon diisocyanates, (e.g., the alkylene diisocyanates and the arylene diisocyanates) as well as known triisocyanates. As examples of suitable polyisocyanates one can mention 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropylether of 1,4-butylene glycol, 1,11-diisocyanatoundecane, 1,12-diisocyanatododecane bis(isocyanatoethoxy)sulfide, 1,4-diisocyanatobenzene, 2,4-diisocyanatotoluene, 2,6-diisocyanato tolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene and mixtures thereof.

The catalysts that are useful in producing polyurethanes in accordance with this invention include: (a) tertiary amines such as bis(dimethylaminoethyl)ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylene-diimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2-(N,N-dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g. dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

When the product being formed is a polyurethane foam, this may be accomplished by employing a small amount of a polyurethane blowing agent, such as water, in the reaction mixture (for example, from about 0.5 to about 5 weight percent of water, based upon total weight of the polymer/polyol composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterphthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product. The anti-scorch properties of the foams produced using polymer/polyol compositions are most evident when at least some of the blowing agent is water and the water is used in an amount that results in a foam having a density less than 1.75 pounds per cubic foot. Generally, the use of water in an amount of at least 3.0 percent by weight based on the total weight of the polymer/polyol composition results in a foam having a density of less than 1.75 pounds per cubic foot.

It is also within the scope of the invention to employ small amounts, e.g., about 0.001 percent to 5.0 percent by weight, based on the total reaction mixture, of a foam stabilizer such as a "hydrolyzable" polysiloxane-polyoxyalkylene block copolymer such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. No. 3,505,377; U.S. patent application Ser. No. 888,067, filed Dec. 24, 1969 and British Patent Specification No. 1,220,471. The latter class of copolymers differs from the above mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer with the remainder being polyoxyalkylene polymer.

Particularly useful foam formulations utilizing polymer/polyols are well known and are being presently used commercially to form various foam products. It has been found that, when using such conventional formulations, foams made with polymer/polyols utilizing the stabilizers prepared by the technique of this invention previously described herein exhibit a tendency to collapse. It is believed that, in some unknown fashion, these polymer/polyols upset the stability of the rising foam. This tendency can be overcome by, for example, either increasing the amount of catalyst used or by increasing the amount of the silicone or other surfactant employed.

The polyurethanes produced in accordance with this invention may be advantageously employed in various applications. For example, the present invention allows the production of polyurethane foams form polymer/polyols in which the polymer portion can be formed from a monomer system containing less than about 20 to 30 percent by weight acrylonitrile. Such foams find advantageous utility in the slab foam market where the cross-sections of the buns are relatively large and where a relatively large exotherm is encountered. In such situations, polyurethane foams produced in accordance with this invention result in white products with little scorch whatever being visually detectable. Still further, the polymer/polyols of this invention may be used to form polyurethane elastomers in which relatively low molecular weight polyols must be used to provide the requisite stiffness. In addition, polymer/polyols stabilized in accordance with the present invention may be utilized to form polyurethane products where maximum load-bearing characteristics are required since the stabilization achieved allows the use of a relatively high polymer content.

In accordance with yet another aspect of the present invention, effective stabilizers can be prepared without the initial step of forming a macromonomer. To this end, effective stabilizers can be prepared by polymerizing in an inert solvent with a free radical catalyst a polypropylene oxide material (forming the solvatable portion) with the monomer or monomers forming the anchor portion.

In this embodiment, the same considerations, in general, which are involved in forming stabilizers using the macromonomer technique are equally applicable. Thus, the propylene oxide material may be the adduct of propylene oxide with a monol, diol, triol or the like. The minimum molecular weight of the resulting adduct should be at least about 800, preferably at least about 1800 and most preferably about 2600. However, for reasons which will be apparent in the ensuing discussion, it is preferred to employ materials having relatively high molecular weights.

More specifically, in this embodiment, the stabilizer consists of graft species obtained only by hydrogen abstraction. Accordingly, it is preferred to employ a free radical catalyst which enhances hydrogen abstraction, such as a peroxide catalyst. Further, relatively large solvatable portion molecular weights are required to insure that the desired steric barrier is provided.

Inasmuch as this technique eliminates the need to form the macromonomer, stabilizers produced by this technique offer real economic advantages. While it has been found that useful concentrations may require up to twice the amount of stabilizers made with the macromonomer technique to provide equivalent stability characteristics, there is still a significant economic advantage in using this alternative technique.

In connection with this technique, a further aspect of this invention provides modifying the polypropylene oxide material by incorporation of a group which enhances hydrogen abstraction. While various compounds are known and may be used, a particularly useful solvatable portion comprises the reaction product of the propylene oxide material with toluene diisocyanate. This requires that the propylene oxide material either contain, as formed, at least one functional group reactive with the diisocyanate or be modified after preparation to introduce the requisite functional group or groups. Regardless of the type, it is preferred in this embodiment that the propylene oxide material be monofunctional, although difunctional materials are satisfactory. The use of tri- or higher functionality materials should be avoided as extensive cross-linking has been found to occur. Hydroxyl groups are particularly preferred as the functional group. The diisocyanate is desirably used in an amount sufficient to insure reaction of the isocyanato groups.

Moreover, the utilization of this technique to prepare polymer/polyols results in an unexpected advantage in forming polyurethane foams. Thus, in contrast to polyurethane foams made using polymer/polyols employing stabilizers prepared by the macromonomer technique, polyurethane foams made using polymer/polyols prepared by this alternative technique, for some reason, exhibit less tendency to collapse. This allows the use of the same foam formulation as would be used with a polymer/polyol formed by known techniques. The advantages are apparent.

In accordance with yet another aspect of the present invention, no separate equipment is needed to prepare the stabilizers. Thus, in a commercial run to prepare polymer/polyols, the equipment to be used may be initially employed to react the solvatable and anchor portions to form the required amount of stabilizer. After completion, the polymer/polyol run can be carried out in the same equipment. The economic advantages involved can be significant, particularly in the mode where the solvatable portion used is an unmodified polypropylene oxide material. In such a situation, it is possible to use the polyol as the solvatable portion and the same monomer or monomers to be employed to form the polymer part of the polymer/polyol as the anchor portion, thereby requiring only the solvent used to form the stabilizer as a further raw material.

Regardless of the mode of preparation used for the solvatable portion, the resulting stabilizers of this invention are characterized by relatively high viscosities in relation to polymer/polyols having comparable polymer contents. Thus, after removal of the solvent used to prepare the stabilizer, the stabilizer will be a solid or a liquid whose viscosity will typically range from about 60,000 up to 260,000 or more centipoises at 25° C.

The physical character of the stabilizers, after solvent removal, ranges from a paste to a solid, depending upon the type of solvatable portion utilized and the weight ratio of the monomers used to form the anchor portion. In the macromonomer mode, the stabilizers are usually solid or semi-solid regardless of the monomers used for the anchor. With the free radical grafting mode using a polypropylene oxide material, the character of the stabilizer varies from a solid or semisolid with an anchor portion made from a 30/70 acrylonitrile/styrene monomer charge to a paste when the acrylonitrile/styrene weight ratio is increased to 50/50 or higher. While the chemical compositions of the preformed stabilizers of this invention may be essentially identical with the graft or addition copolymers formed in situ in conventional polymer/polyol preparation, there are three basic differences. In the first instance, the process parameters used to prepare the preformed stabilizers can be coordinated to enhance grafting efficiency, a circumstance that may not be the situation in polymer/polyol production where the graft or addition copolymer is formed in situ. Secondly, a preformed stabilizer can be tailored to the particular monomer system being used and thus does not suffer from the serious limitation of being identical in composition to the monomer system and polyol being used in the polymer/polyol preparation. Lastly, the in situ formed graft or addition copolymer does not have practical utility apart from the particular polymer/polyol in which it is formed because it is difficult to isolate.

The following Examples are illustrative, but not in limitation of, the present invention. These Examples describe all of the several parameters involved in preparing and using the stabilizers of the present invention, ranging from the preparation of the macromonomer used in one embodiment as the solvatable portion to screening of the parameters used to form the stabilizers to characterizing the effectiveness of the stabilizers in a variety of polymer/polyol preparations. Because of the relatively large number of parameters involved, a proper evaluation of the data contained requires a careful consideration of all of these parameters. The Examples should therefore be considered together, presenting a trend showing useful parameters and stabilizers for various polymer/polyol preparations. Thus, as one example, the amount of stabilizer used must be scrutinized. A level of 1% by weight provides an indication of the effectiveness of the stabilizer; but the use of increased amounts, consistent with this invention, will enhance stability.

DEFINITIONS

As used in the Examples appearing below, the following designations, symbols, terms and abbreviations have the indicated meanings:

"Theoretical molecular weight" of a polyol denotes a molecular weight calculated using the equation previously set forth based on the functionality of the starter used to produce the polyol and the experimentally determined hydroxyl number of the polyol.

"Molecular weights" of polyols are number average molecular weights.

"rpm" denotes revolutions per minute.
"mg" denotes milligrams.
"A" denotes acrylic acid.
"MMA" denotes methylmethacrylate.
"MA" denotes methacrylic acid.
"TBPO" denotes t-butyl per-2-ethylhexoate.
"AZO" denotes 2,2'-azobisisobutyronitrile.
"TMSN" denotes tetramethylsuccinonitrile.
"pcf" denotes pounds per cubic feet.
"Sol" denotes solution.
"S" denotes solid.
"%" denotes percent by weight.
"wt" denotes weight.
"Ratio" denotes weight ratio.

"Polypropylene oxide material I"—a monohydroxyl polypropylene oxide produced from propylene oxide and butanol having a number average molecular weight of about 800.

"Polypropylene oxide material II"—a monohydroxyl propylene oxide produced from propylene oxide and butanol having a number average molecular weight of about 1800.

"Polypropylene oxide material III"—a monohydroxyl polypropylene oxide produced from propylene oxide and butanol having a number average molecular weight of about 2600.

"Polypropylene oxide material IV"—a polypropylene oxide diol produced from propylene oxide and dipropylene glycol and having a theoretical number average molecular weight of about 4000.

"Polypropylene oxide material V"—a propylene oxide triol produced from propylene oxide and glycerine and having a theoretical number average molecular weight of about 6000.

"Polyol I"—a polypropylene oxide triol produced from propylene oxide and glycerine and having a theoretical number average molecular weight of about 3000.

"Polyol II"—a polypropylene oxide diol produced from propylene oxide and dipropylene glycol and having a theoretical number average molecular weight of about 400.

"Polyol III"—a polypropylene oxide diol produced from propylene oxide and dipropylene glycol and having a theoretical number average molecular weight of about 1000.

"Polyol IV"—a polypropylene oxide triol having about 14% internal ethylene oxide content, a hydroxyl number of about 46.6 and having a number average molecular weight of about 3600.

"Polyol V"—a propoxylated/ethoxylated polyol having a hydroxyl number of about 56 mg. KOH/gm, an internal ethylene oxide content of about 8%, and a number average molecular weight of about 3000.

"Urethane Catalyst"—a solution consisting of 70% Bis(2-dimethylaminoethyl)ether and 30% dipropylene glycol.

"Silicone Surfactant I—a mixture of 55 wt.-% of a block copolymer having the formula:

$$Me_3SiO(Me_2SiO)_{72}(MeSiO)_{5.1}SiMe_3$$
$$|$$
$$C_3H_6(OC_2H_4)_{24}(OC_3H_6)_{27}OMe$$

where Me denotes the methyl group; and 45 wt.-% of a polyether having the formula:

$$C_4H_9O(C_2H_4O)_{18}(C_3H_6O)_{13.7}H$$

"Silicone Surfactant II"—a mixture of 80 wt.-% of the above block copolymer and 20 wt.-% of the above polyether.

POLYMER/POLYOL PROPERTIES

Filtration Hindrance (Filterability)

This is determined by diluting a sample (470 grams) of polymer/polyol with anhydrous isopropanol (940 grams) to remove any viscosity-imposed limitations and using a fixed quantity of material in relation to a fixed cross-sectional area of screen (2.4 sq. in.) such that about 200 grams of product are passed through 150 or 700-mesh screen per one square inch of screen. The 700-mesh screen is made with a Dutch twill weave. The actual screen used had a nominal opening of 30 microns and is described in Bulletin 46267-R of the Ronningen-Petter Company of Kalamazoo, Mich. The difference between the final and initial screen weights corresponds to the amount of polymer that did not pass through the screens. The 150-mesh screen has a square mesh with average mesh opening of 105 microns, and it is a "Standard Tyler" 150 square mesh screen. The amounts which pass through are reported in percent, a percentage of 100% being preferred. Trace solids will generally always be present, but a value of 100% indicates that over 99 weight percent passes through the screen.

Centrifugible Solids

After stripping unreacted monomer, the polymer/polyol composition is centrifuged for about 24 hours at about 3000 revolutions per minute and 1470 radial centrifugal "g" force. The centrifuge tube is then inverted and allowed to drain for 4 hours. The non-flowing cake remaining at the bottom of the tube is reported as wt. percent of the initial weight of the composition tested. To provide a commercially satisfactory stable polymer/polyol, the solid should be less than about 10%, preferably less than 5%.

FOAM PROCESS PARAMETERS AND PROPERTIES

Cream Time

The interval of time from the formation of the complete foam formulation to the appearance of a creamy color in the formulation. The creaming time is proportional to the rate of reaction of the formulation.

Rise Time

The interval of time from the formation of the complete foam formulation to the attainment of the maximum height of the foam.

Porosity

A specimen of foam ½ inch in thickness is compressed between two pieces of flanged plastic tubing 2¼ inches in diameter (ID). This assembly then becomes a component in an air flow system. Air at a control velocity enters one end of the tubing, flows through the foam specimen and exits through a restriction at the lower end of the assembly. The pressure drop across the foam due to the restriction of air passage is measured by means of an inclined closed manometer. One end of the manometer is connected to the upstream side of the foam and the other end to the downstream side. The flow of air on the upstream side is adjusted to maintain a differential pressure across the specimen of 0.1 inch of water. The air porosity of the foam is reported in units of air flow per unit area of specimen, cubic feet per minute per square foot.

Tensile Strength
ASTM D1564-69.

Tear Resistance
ASTM D1564-69.

ILD
ASTM D1564-69.

Compression Set
ASTM D1564-69.

Elongation
ASTM D1564-69.

Nopco Breathability
ASTM D-1564-69.

Refractometer

Using an IDL color eye model no. D1, made by Kollmorgen Corp., Attleboro, Mass., a numerical rating of from 0 to 100 is made on the test specimen by comparison to a series of standards. A rating of "100" corresponds to a specimen rated as being white.

PREPARATION OF MACROMONOMERS

The polypropylene oxide material, methacrylic acid or other material used to provide the terminal unsaturation, solvent and other constituents (e.g.—acidic catalyst and the like) were placed in a 4-necked amber glass 5-liter flask equipped with a thermometer, magnetic stirrer, boiling stones and a 10-tray Oldershaw column with decanting still head. The mixture was refluxed for from about 8 to about 12 hours at a temperature in the range of from about 80° to about 100° C., and the water from the reaction was collected. The product was then neutralized at 50° C. with sodium hydroxide in water (to form a salt). The mixture was stirred for about one hour and allowed to set for 16 hours. The water was then azeotroped from the product. The dry product was mixed with a commercially available filter aid and filtered under 100 pounds of pressure at 100° C. to remove the salt (e.g.—sodium p-toluene sulfonate or sodium sulfate).

PREPARATION OF DISPERSANT OR STABILIZER

Unless otherwise indicated, the procedure employed was as follows. The monomers, macromonomer or polypropylene oxide material, catalyst and solvent were placed in a 500 milliliter 4-necked flask equipped with a stirrer, dropping funnel, water-cooled condenser, temperature control and nitrogen inlet and outlet. The flask was heated while stirring under a slight nitrogen purge. Additional monomer or monomers and the remainder of the catalyst charge were added over a period of about one hour. The ratio of monomer or monomers used to the macromonomer or polypropylene oxide material was in the range of, by weight, 30–50 monomer or monomers/50–70 macromonomer or polypropylene oxide material; and the total weight of these components in the solvent was in the range of 30 to 50 percent. The mixture was heated and stirred for an additional hour, cooled and stored in a glass jar.

POLYMER/POLYOL PREPARATION

Unless otherwise indicated, the polymer/polyols were prepared by adding the polyol to a 1-liter, 4-necked flask equipped with a stirrer (Lightnin Stirrer), dropping funnel, water-cooled condenser, nitrogen inlet and outlet. The flask and contents were heated to the temperature desired, and part of the free radical catalyst employed added. The monomer mixture being utilized with additional amounts of the free radical catalyst employed were then added dropwise from the dropping funnel over a period of about 45 minutes with continuous rapid stirring. The mixture was stirred at a high rate of speed initially, viz.—as fast as possible without excessive splashing, until about ½ of the monomer mixture had been added. At this time, the stirring was increased again as much as possible without causing excessive splashing. After completion of monomer addition, the reaction mixture was heated and stirred for about an additional hour. In some cases, a slight temperature rise was noted; and, in most cases, no attempt was made to prevent such temperature increase. The samples were then cooled, and a small amount taken for free monomer analysis by gas chromatography. Also, unless otherwise indicated, the weight ratio of monomer mixture to polyol used was 20/80.

EXAMPLES 1–7

These Examples illustrate the preparation of macromonomers using polypropylene oxide materials having molecular weights varying from about 800 to about 5000, with the terminal monoethylenic unsaturation being provided by using either methacrylic acid or acrylic acid.

The process used was the same as has been previously set forth, and the parameters are set forth in Table I:

TABLE I

| Example No. | 1 | 2 | 3 | 4 | 5 | 6 | 7 |
|---|---|---|---|---|---|---|---|
| Polypropylene oxide, material, type | I | II | III | | | IV | V |
| gms. | 3000 | | | | | | |
| Unsaturated acid, type | MA | A | MA | A | A | A | A |

TABLE I-continued

| Example No. | 1 | 2 | 3 | 4 | 5 | 6 | 7 |
|---|---|---|---|---|---|---|---|
| gms. | 305 | 127 | 120 | 100 | 100 | 54 | 46 |
| Solvent, type | Benzene | Toluene | Benzene | Benzene | Toluene | Benzene | Benzene |
| gms. | 715 | | | | | | |
| Monomethyl ether hydroquinone, gms.[1] | 0.15 | 1.0 | 0.6 | 0.6 | 0.6 | 1 | 1 |
| 2,6-dimethyl 2, 4, 6-octatriene, gms.[1] | 5 | — | 5 | 5 | 5 | 5 | — |
| p-toluene sulfonic acid, gms.[2] | 50 | — | — | — | — | — | — |
| sulfuric acid gms.[2] | — | 36 | | | | | |

[1]Inhibitor
[2]Catalyst

EXAMPLES 8–28

These Examples show the preparation of stabilizers having an acrylonitrile-styrene copolymer anchor portion and, except for Example 19, a solvatable portion formed with a terminal, monoethylenically unsaturated macromonomer, the polypropylene oxide material used in preparing the macromonomer having a molecular weight in Examples 8–23 of about 2600 and in Examples 24–28 of about 800.

The stabilizers were prepared by terpolymerizing acrylonitrile, styrene and the macromonomer at a temperature of 100° C., with the exception of Examples 8–10 which were polymerized at 90° C. and Example 11 wherein the polymerization was carried out at 80° C. The procedure for Example 19 was carried out at 100° C. and was similar to that described except that the solvatable portion was an unmodified polypropylene oxide material, the resulting graft specie being formed via hydrogen abstraction. The solvents used in preparing the stabilizers were varied as were the relative amounts of the solvatable and anchor portions. The resulting stabilizers were evaluated in terms of their homogeneity, solubility in Polyol I and stabilizing effectiveness as observed in a general screening test conducted by preparing a polymer/polyol in the presence of the stabilizer. The macromonomer and stabilizer compositions as well as the properties of the stabilizers are set forth in Table II:

TABLE II

| Example No. | 8 | 9 | 10 | 11 | 12 | 13 | 14 | 15 | 16 | 17 |
|---|---|---|---|---|---|---|---|---|---|---|
| Macromonomer | | | | | | | | | | |
| Polypropylene oxide material | III | → | → | → | → | → | → | → | → | → |
| Unsaturated acid | MA | → | → | → | → | → | → | → | → | → |
| Stabilizer | | | | | | | | | | |
| Solvent[1] | Tol | Tol | Tol | Ben | Tol | Tol | E Ben | Tol | Tol | Tol/MEK |
| Ratio acrylonitrile to styrene monomer | 30/70 | 30/70 | 30/70 | 30/70 | 30/70 | 30/70 | 30/70 | 15/18 | 85/15 | 30/70 |
| % Solids[2] | 27.5 | 27.7 | 25.7 | 31.7 | 45.5 | 47.1 | 27.4 | 25.2 | 31.9 | 26.1 |
| % Vinyl content Reactants | 50 | 50 | 70 | 50 | 50 | 30 | 50 | 50 | 50 | 50 |
| Stabilizer (NMR) | 41.6 | 38.1 | 54 | 34.8 | 44.5 | 26.2 | 38.7 | 33.7 | 33 | 38.3 |
| Catalyst | TBPO | AZO | TBPO | → | → | → | → | → | → | → |
| Stabilizer Properties | | | | | | | | | | |
| After standing[5] | SS | C | C | NS | NS | SS | SS | NS | NS[6] | SS |
| Solubility in Polyol I | Good | Poor | Poor | Good | V.Poor | V.Good | Good | Good | Good | Good |
| Stabilizing ability[7] | Good | Poor | Poor | Good | Poor | V.Good | Poor | Poor | Poor | Poor |

| Example No. | 18 | 19 | 20 | 21 | 22 | 23 | 24 | 25 | 26 | 27 | 28 |
|---|---|---|---|---|---|---|---|---|---|---|---|
| Macromonomer | | | | | | | | | | | |
| Polypropylene oxide material | III | → | → | → | → | → | I | → | → | → | → |
| Unsaturated acid | MA | None | MA | MA | A | A | MA | | | | |
| Stabilizer | | | | | | | | | | | |
| Solvent[1] | Polyol I | Tol | → | → | → | → | → | → | → | → | → |
| Ratio acrylonitrile to styrene monomer | 30/70 | 30/70 | 75/25 | 30/70 | 30/70 | 30/70 | 30/70 | 30/70 | 30/70 | 30/70 | 30/70 |
| % Solids[2] | — | 28.5 | 32.7 | 28.6 | 29.1 | 29.9 | 28.7 | 30.9 | 28.8 | 31.3 | 36.1 |
| % Vinyl content Reactants[3] | 50 | 50 | 50 | 40 | 50 | 40 | 50 | 30 | 70 | 20 | 30 |
| Stabilizer (NMR)[4] | — | 40.9 | 34.2 | 32.6 | 45.4 | 34.5 | 52 | 32.7 | 67.4 | 26.4 | 33.4 |
| Catalyst | TBPO | → | → | → | → | → | → | → | → | → | → |
| Stabilizer Properties | | | | | | | | | | | |
| After standing[5] | NS | C | NS[2] | NS | NS | NS | NS | NS | NS | NS | NS |
| Solubility in Polyol I | Good | Good | Good | Good | Good | Good | Poor | Good | Poor | Good | Good |
| Stabilizing ability[7] | Poor | Poor | Poor | Good | Poor | Good | Poor | Poor | Poor | Fair | Fair |

FOOTNOTES
[1]Tol: Toluene, Ben: benzene, E. Ben: ethyl benzene, Tol/MEK: 50/50 mixture of toluene and methyl ethyl ketone.
[2]Solids refers to the residue that remains when solvent is evaporated from stabilizer solution.
[3]Percent by weight of vinyl monomers based on total weight of vinyl monomers and macromonomer reactants.
[4]Percent by weight of vinyl polymer in residue that remains when solvent is evaporated from stabilizer solution.
[5]SS - a slight settling of a small amount of polymer out of the solution.
C - stabilizer separated into a upper and lower layer (coacervated).
NS - stabilizer showed no tendency to settle out of solution.
[6]Stabilizers did not settle but were opaque with a light orange color.
[7]This was evaluated in these and subsequent Examples by observation of the resulting viscosity and centrifugible solids when used to form polymer/polyols in Polyol I with an acrylonitrile/styrene ratio of 40/60.

As can be seen, superior stabilization is provided with a stabilizer formed with a polypropylene oxide material of 2600 molecular weight, TBPO as the catalyst and toluene or benzene as the solvent. As shown in Examples 8, 13 and 23, a concentration of 30-50% vinyl monomer is desirable.

EXAMPLES 29–35

These Examples demonstrate the preparation of additional useful stabilizers with polypropylene oxide materials having molecular weights ranging from about 800 to about 5000 and with anchor portions wherein the acrylonitrile/styrene ratio varies from 25/75 to 50/50.

The terpolymerization was carried out using TBPO catalyst; and the results are set forth in Table III, the stabilizers being evaluated in terms of solubility in Polyol I and stabilizing effectiveness observed in a general screening conducted by forming a polymer/polyol in the presence of the stabilizer:

As can be seen from Examples 34 and 35, stabilizers with good stabilizing ability were also provided when the polypropylene oxide material was not condensed with acrylic acid or the like to provide a macromonomer with terminal, monoethylenic unsaturation.

EXAMPLES 36–98

These Examples illustrate the preparation of polymer/polyol using various stabilizers.

The polymer/polyols were prepared in Polyol I with a monomer content of 20% by weight of 40/60 acrylonitrile/styrene using an azo catalyst. For comparison purposes, the acrylonitrile/styrene ratio was varied in selected Examples. The preparation of the polymer/polyols and the properties of the resulting products are summarized in Tables IV–VIII:

TABLE III

| Example No. | 29 | 30 | 31 | 32 | 33 | 34 | 35 |
|---|---|---|---|---|---|---|---|
| Macromonomer | | | | | | | |
| Polypropylene oxide | IV | V | II | III | | | |
| Unsaturated Acid | A | A | A | A | A | None | None |
| Stabilizer | | | | | | | |
| Solvent | Toluene | Toluene | Toluene | Toluene | Toluene | Xylene | Xylene |
| Ratio acrylonitrile to styrene monomer | 27/75 | 30/70 | 30/70 | 50/50 | 45/55 | 45/55 | 50/50 |
| % Solids[1] | — | 29 | 30.8 | 30 | 31.3 | 47.6 | 46.0 |
| Vinyl Content of Reactants[2] | 38.6 | 45 | 40 | 40 | 40 | 50 | 34 |
| Catalyst | TBPO | TBPO | TBPO | TBPO | TBPO | TBPO | TBPO |
| Polymerization Temperature | 100 | 100 | 100 | 100 | 104 | 130 | 130 |
| Stabilizer Properties | | | | | | | |
| Solubility in Polyol I | Good | Good | Good | Good | Good | Good | Good |
| Stabilizing Ability[3] | Good | Good | Poor | Good | Good | Good | Good |

[1]Solids refers to the residue that remains when solvent is evaporated from stabilizer solution.
[2]Percent by weight of vinyl monomers based on total weight of vinyl monomers and macromonomer reactants.
[3]Examples 29–31 evaluated with a polymer/polyol formed from an acrylonitrile/styrene monomer weight ration of 40/60 while Examples 32–35 were evaluated using a somewhat higher styrene content in the monomer ratio (e.g. - about 30/70).

TABLE IV

| Example No. | 36 | 37 | 38 | 39 | 40 | 41 | 42 | 43 | 44 | 45 | 46 | 47 | 48 |
|---|---|---|---|---|---|---|---|---|---|---|---|---|---|
| Preparation | | | | | | | | | | | | | |
| Reaction Temperature, °C. | 110 | 110 | 110 | 110 | 110 | 110 | 110 | 110 | 110 | 110 | 110 | 110 | 110 |
| AZO Conc. Wt. % | 1.3 | 1.3 | 1.3 | 1.3 | 1.3 | 0.98 | 0.98 | 0.98 | 0.98 | 1.3 | 2.4 | 1.3 | 1.3 |
| % Monomer | 20 | 20 | 20 | 20 | 20 | 20 | 20 | 20 | 20 | 20 | 20 | 20 | 20 |
| A/S Ratio | 40/60 | 40/60 | 40/60 | 40/60 | 40/60 | 40/60 | 40/60 | 40/60 | 40/60 | 40/60 | 40/60 | 40/60 | 40/60 |
| Stabilizer composition, from Ex. No. | 8 | 9 | 10 | 11 | 13 | 17 | 15 | 16 | 14 | 8 | 8 | 8 | 10 |
| Wt. % Solid stabilizer | 0.62 | 0.62 | 0.33 | 0.75 | 0.74 | 0.62 | 0.6 | 0.75 | 0.65 | 0.65 | 0.65 | 0.65 | 0.65 |
| Monomer Feed Rate, gm/hr | 65 | 60 | 60 | 65 | 60 | 60 | 60 | 60 | 60 | 60 | 70 | 70 | 70 |
| Residual Acrylonitrile, % | 0.27 | 0.48 | .25 | 0.08 | 0.23 | 0.33 | 0.31 | 0.30 | 0.31 | — | 0.25 | 0.29 | 0.34 |
| Residual Styrene, % | 0.27 | 0.39 | .26 | 0.05 | 0.2 | 0.29 | 0.29 | 0.32 | 0.23 | — | 0.24 | 0.31 | 0.42 |
| Residual TMSN, % | — | — | — | — | — | — | — | — | — | — | 0.03 | — | — |
| Residual Toluene, % | — | — | — | — | — | — | — | — | — | — | — | — | — |
| Residual Benzene, % | — | — | — | — | — | — | — | — | — | — | — | — | — |
| Conversion, Acrylonitrile, % | 96.5 | 94.0 | 96.8 | 99.0 | 97.1 | 95.8 | 96.1 | 96.2 | 96.1 | — | 96.8 | 96.4 | 95.7 |
| Conversion Styrene, % | 97.7 | 96.7 | 97.8 | 99.5 | 98.3 | 97.6 | 97.6 | 97.3 | 98.0 | — | 98.0 | 97.0 | 96.1 |
| Conversion Combined, % | 97.2 | 95.6 | 97.4 | 99.4 | 97.8 | 96.9 | 97.0 | 96.9 | 97.2 | — | 97.0 | 97.0 | 96.1 |
| Total Polymer in Product, calc. % | 19.2 | 18.9 | 19.2 | 19.6 | 19.4 | 19.2 | 19.2 | 19.2 | 19.2 | — | 19.2 | 19.2 | 19.0 |
| Properties | | | | | | | | | | | | | |
| Viscosity (Brookfield), 25° C., cps | 1,320 | 1,808 | 2,828 | 1,272 | 1,696 | 3,000 | 3,100 | — | 7,480 | 3,860 | 6,400 | 1,580 | 1,712 |
| Acid No. (Experimental) | 0.0044 | 0.0045 | 0.0053 | 0.0053 | 0.0053 | 0.0053 | 0.0065 | 0.0070 | 0.0065 | — | — | — | — |
| Hydroxyl No. (Experimental) | — | — | — | — | — | — | — | — | — | — | — | — | — |
| Filtration Hindrance: 150 Mesh Screen, % Thru | 100 | — | — | 100 | 100 | — | — | — | — | — | — | — | 1.5 |
| Solids on screen, ppm | 25 | — | — | 13,5 | 6.3 | — | — | — | — | — | — | — | 21,311 |
| 700 Mesh Screen, Time, | >1200 | — | — | >1200 | >1200 | — | — | — | — | — | — | — | — |

TABLE IV-continued

| Example No. | 36 | 37 | 38 | 39 | 40 | 41 | 42 | 43 | 44 | 45 | 46 | 47 | 48 |
|---|---|---|---|---|---|---|---|---|---|---|---|---|---|
| 700 Mesh Screen, % Thru | 17.1 | — | — | 46.6 | 66.60 | — | — | — | — | — | — | — | — |
| Solids on screen, ppm | 122.7 | — | — | 87.9 | 22.5 | — | — | — | — | — | — | — | — |
| Centrifugible Solids, (Wt. %) | 1.28 | 4.27 | 16.3 | 1.21 | 1.30 | 6.83 | 16.42 | 31.96 | 33.65 | 14.13 | 14.49 | 3.43 | 6.96 |

TABLE V

| Example No. | 49 | 50 | 51 | 52 | 53 | 54 | 55 | 56 | 57 | 58 | 59 | 60 | 61 |
|---|---|---|---|---|---|---|---|---|---|---|---|---|---|
| Preparation | | | | | | | | | | | | | |
| Reaction Temperature | 110 | 110 | 110 | 110 | 110 | 110 | 110 | 110 | 80 | 80 | 95 | 95 | 110 |
| AZO Conc. Wt. % | 1.3 | 1.3 | 1.3 | 1.3 | 1.3 | 1.3 | 1.3 | 1.3 | 1.3 | 1.3 | 1.3 | 1.3 | 1.3 |
| % Monomer | 20 | 20 | 20 | 20 | 20 | 20 | 20 | 20 | 20 | 20 | 20 | 20 | 18 |
| A/S Ratio | 40/60 | 40/60 | 40/60 | 20/80 | 0/100 | 40/60 | 40/60 | 40/60 | 40/60 | 40/60 | 40/60 | 40/60 | 40/60 |
| Stabilizer composition, from Example No. | 11 | 11 | 11 | 8 | 8 | 8 | 8 | 8 | 8 | 8 | 8 | 8 | 8 |
| Wt. % Solid Stabilizer | 0.65 | 0.65 | 0.65 | 0.65 | 0.65 | 0.65 | 1.29 | 0.17 | 0.65 | 0.65 | 0.65 | 1.80 | 1.3 |
| Monomer Feed Rate, gm/hr | 70 | 70 | 70 | 70 | 70 | 70 | 70 | 75 | 45 | 90 | 90 | 60 | 52 |
| Residual Acrylonitrile, % | 0.08 | 0.22 | 0.88 | 0.07 | — | 0.29 | 0.24 | 0.33 | 0.41 | 0.16 | 0.12 | 0.15 | 0.24 |
| Residual Styrene, % | 0.09 | 0.24 | 0.30 | 1.27 | 3.07 | 0.23 | 0.30 | 0.12 | 0.04 | 0.08 | 0.08 | 0.14 | 0.24 |
| Residual TMSN, % | — | — | — | — | 0.02 | 0.05 | 0.61 | 0.76 | 0.7 | 0.56 | 0.32 | 0.56 | 0.49 |
| Residual Toluene, % | — | — | — | — | — | — | — | — | — | 1.44 | 0.05 | 2.88 | 2.7 |
| Residual Benzene, % | — | — | — | — | — | — | — | — | — | 0.08 | 1.09 | 0.14 | 0.05 |
| Conversion, Acrylonitrile, % | 99.0 | 98.4 | 95.8 | 99.1 | — | 96.4 | 98.7 | 95.8 | 94.8 | 96.7 | 98.5 | 98.2 | 96.8 |
| Conversion, Styrene, % | 99.2 | 98.0 | 97.5 | 92.0 | 84.40 | 98.1 | 97.5 | 97.3 | 99.7 | 99.3 | 99.3 | 98.9 | 97.4 |
| Conversion, Combined, % | 99.0 | 97.7 | 96.8 | 93.3 | 84.4 | 97.4 | 97.2 | 96.6 | 97.7 | 98.3 | 99.0 | 98.5 | 97.3 |
| Total Polymer in Product, Calc. % | 19.6 | 19.0 | 19.2 | 18.4 | 16.7 | 19.2 | 19.2 | 19.1 | 19.3 | 19.4 | 19.3 | 19.4 | 17.3 |
| Properties | | | | | | | | | | | | | |
| Viscosity (Brookfield) 25° C., cps. | 2,800 | 7,7500 | 9.700 | 1,130 | 1,140 | 6,150 | 2,950 | 2,688 | 8,700 | 10,400 | 11,300 | 3,270 | 1,224 |
| Acid No. (Experimental) | — | — | — | — | 0.0181 | — | — | — | — | — | 0.0101 | — | — |
| Hydroxyl No. (Experimental) | — | — | — | — | 43,56 | — | — | — | — | — | 43.41 | — | — |
| Filtration Hindrance: 150 Mesh Screen, % Thru | 4.5 | — | — | 5.1 | 100 | — | — | 1.8 | — | — | 0.5 | 3.0 | 6.5 |
| Solids on Screen, ppm | 2,504 | — | — | 3,256 | 897 | — | — | 5,734 | — | — | 65,395 | 2,709 | 2,853 |
| 700 Mesh Screen, Time, Sec. | >1200 | — | — | >1200 | >1200 | — | — | — | — | — | — | >1200 | >1200 |
| 700 Mesh Screen, % Thru | 0.2 | — | — | 0.4 | 14.7 | — | — | — | — | — | — | 0.08 | 2.8 |
| Solids on Screen, ppm | 19.737 | — | — | 5,207 | 3,664 | — | — | — | — | — | — | 24,3754 | 2,117 |
| Centrifugible Solids, wt. % | 4.95 | 17.42 | 47.06 | 7.19 | 25.87 | 25.63 | 5.71 | 10.31 | 72.26 | 75.39 | 28.43 | 6.74 | 2.40 |

TABLE VI

| Example No. | 62 | 63 | 64 | 65 | 66 | 67 | 68 | 69 | 70 | 71 | 72 | 73 | 74 |
|---|---|---|---|---|---|---|---|---|---|---|---|---|---|
| Preparation | | | | | | | | | | | | | |
| Reaction Temperature | 110 | 110 | 110 | 115 | 115 | 110 | 110 | 110 | 110 | 110 | 120 | 120 | 120 |
| AZO Conc. Wt. % | 0.71 | 0.71 | 0.71 | 0.71 | 0.71 | 1.3 | 1.3 | 1.3 | 1.3 | 1.3 | 1.3 | 1.3 | 1.3 |
| % Monomer | 20 | 20 | 20 | 20 | 20 | 20 | 20 | 20 | 20 | 20 | 20 | 20 | 20 |
| A/S Ratio | 40/60 | 40/60 | 40/60 | 40/60 | 40/60 | 40/60 | 40/60 | 40/60 | 40/60 | 40/60 | 40/60 | 40/60 | 40/60 |
| Stabilizer composition, from Example No. | 11 | 11 | 11 | 11 | 11 | 11 | 11 | 13 | 22 | 22 | 22 | 13 | 21 |
| Wt. % Solid Stabilizer | 1.5 | 1.5 | 1.5 | 1.5 | 0.72 | .5 | 1.4 | 1.3 | 1.4 | 1.4 | 1.4 | 1.3 | 1.4 |
| Monomer Feed Rate, gm/hr | 65 | 65 | 75 | 50 | 50 | 120 | 120 | 120 | 120 | 120 | 150 | 150 | 150 |
| Residual Acrylonitrile, % | 0.19 | 0.25 | 0.25 | 0.22 | 0.27 | 0.23 | 0.24 | 0.20 | 0.20 | 0.17 | 0.30 | 0.34 | 0.35 |
| Residual Styrene, % | 0.19 | 0.25 | 0.22 | 0.21 | 0.26 | 0.17 | 0.22 | 0.25 | 0.25 | 0.17 | 0.23 | 0.27 | 0.22 |
| Residual TMSN, % | 0.23 | 0.25 | 0.18 | 0.18 | 0.17 | 0.35 | 0.65 | 0.65 | 0.65 | 0.42 | 0.49 | 0.49 | 0.46 |
| Residual Toluene, % | 0.01 | — | — | — | — | — | — | 1.14 | 1.14 | 2.14 | 2.90 | 1.2 | 2.95 |
| Residual Benzene, % | 1.90 | 1.72 | 2.39 | 2.24 | 1.31 | 2.34 | 2.05 | 0.05 | 0.05 | 0.05 | 0.06 | 0.05 | 0.05 |
| Conversion, Acrylonitrile, % | 97.9 | 96.8 | 96.8 | 94.3 | 96.6 | 97.3 | 97.0 | 97.4 | 97.4 | 97.8 | 96.1 | 97.7 | 98.1 |
| Conversion, Styrene, % | 97.6 | 97.8 | 98.1 | 98.2 | 97.8 | 98.6 | 98.1 | 97.8 | 97.8 | 98.6 | 98.8 | 97.7 | 98.1 |
| Conversion, Combined, % | 98.1 | 97.5 | 97.6 | 97.9 | 97.0 | 98.0 | 97.6 | 97.7 | 97.7 | 98.3 | 97.3 | 96.9 | 97.1 |

TABLE VI-continued

| Example No. | 62 | 63 | 64 | 65 | 66 | 67 | 68 | 69 | 70 | 71 | 72 | 73 | 74 |
|---|---|---|---|---|---|---|---|---|---|---|---|---|---|
| Total Polymer in Product, Calc. % | 19.2 | 19.2 | 19.1 | 19.3 | 19.1 | 19.2 | 19.2 | 19.2 | 19.2 | 19.3 | 19.1 | 19.0 | 19.1 |
| Properties | | | | | | | | | | | | | |
| Viscosity (Brookfield) 25° C., cps. | 2,304 | 23,000 | 3,650 | 2,920 | 3,770 | 1,220 | 1,240 | 1,212 | 1,110 | 1,364 | 1,320 | 1,108 | 1,166 |
| Acid No. (Experimental) | — | — | — | — | — | 0.0129 | — | 0.0065 | 0.0114 | — | 0.0114 | 0.0106 | 0.0442 |
| Hydroxyl No. (Experimental) | — | — | — | — | — | 42.49 | — | 42.49 | 42.70 | — | 42.70 | 42.49 | 41.04 |
| Filtration Hindrance: | | | | | | | | | | | | | |
| 150 Mesh Screen, % Thru | 14.7 | — | — | 4.0 | 1.0 | 100 | 100 | 100 | 11.9 | 5.79 | 11.9 | 100 | 100 |
| Solids on Screen, ppm | 153 | — | — | 341 | 34,965 | 40.8 | 28.5 | 2.4 | 5,530 | 11,906 | 5,530 | 17.4 | 33.3 |
| 700 Mesh Screen, Time, Sec. | >1200 | — | — | >1200 | — | >1200 | >1200 | 2314 | >1200 | >1200 | >1200 | 334 | 610 |
| 700 Mesh Screen, % Thru | 1.4 | — | — | 0.3 | — | 47.1 | 46.0 | 100 | 3.0 | 2.14 | 3.0 | 100 | 100 |
| Solids on Screen, ppm | 1,138 | — | — | 10,700 | — | 47.7 | 20.4 | 18 | 1,725 | 3,266 | 1,725 | 110 | 54 |
| Centrifugible Solids, wt. % | 2.30 | 62.65 | 4.01 | 4.36 | 33.38 | 1.03 | 1.06 | 1.03 | 1.65 | 2.12 | 1.45 | 0.43 | 0.56 |

TABLE VII

| Example No. | 75 | 76 | 77 | 78 | 79 | 80 | 81 | 82 | 83 | 84 | 85 | 86 |
|---|---|---|---|---|---|---|---|---|---|---|---|---|
| Preparation | | | | | | | | | | | | |
| Reaction Temperature, °C. | 120 | 120 | 120 | 120 | 120 | 120 | 120 | 120 | 120 | 120 | 120 | 120 |
| AZO Conc. Wt. % | 1.3 | 1.3 | 1.3 | 1.3 | 1.4 | 1.3 | 1.3 | 1.3 | 1.3 | 1.3 | 1.3 | 1.3 |
| % Monomer | 20 | 20 | 20 | 20 | 20 | 20 | 20 | 20 | 20 | 20 | 20 | 20 |
| A/S Ratio | 40/60 | 40/60 | 40/60 | 40/60 | 40/60 | 40/60 | 40/60 | 40/60 | 40/60 | 40/60 | 40/60 | 40/60 |
| Stabilizer composition, from Ex. No. | 23 | 18 | 20 | 15 | (1) | None | 21 | 21 | None | None | (2) | 21 |
| Wt. % Solid | 1.4 | 4.2 | 1.4 | 1.4 | 1.3 | 0 | 1.4 | 1.4 | 0 | 0 | 0.52 | 0.7 |
| Monomer Feed Rate, gm/hr | 112 | 112 | 150 | 112 | 112 | 112 | 112 | 112 | 112 | 112 | 112 | 112 |
| Residual Acrylonitrile, % | 0.38 | 0.45 | 0.46 | 0.58 | 0.28 | 0.46 | 0.58 | 0.45 | 0.32 | 0.26 | 0.29 | 0.38 |
| Residual Styrene, % | 0.26 | 0.37 | 0.27 | 0.21 | 0.28 | 0.31 | 0.33 | 0.20 | 0.29 | 0.12 | 0.32 | 0.30 |
| Residual TMSN, % | 0.53 | 0.56 | 0.72 | 0.56 | 0.40 | 0.47 | 0.68 | 0.49 | 0.58 | 0.48 | 0.49 | 0.54 |
| Residual Toluene, % | 3.02 | — | 2.86 | 3.83 | — | — | 3.10 | 3.28 | — | — | — | 1.37 |
| Residual Benzene, % | 0.06 | 0.08 | 0.12 | 0.10 | 0.05 | 0.05 | 0.16 | 0.13 | 0.09 | 0.06 | 0.05 | 0.05 |
| Conversion, Acrylonitrile, % | 95.1 | 94.3 | 94.1 | 92.5 | 96.4 | 94.1 | 92.5 | 94.3 | 95.9 | 96.7 | 96.3 | 95.1 |
| Conversion Styrene, % | 97.8 | 96.9 | 97.7 | 98.2 | 97.6 | 97.4 | 97.2 | 98.3 | 97.5 | 99.0 | 96.3 | 97.5 |
| Conversion Combined, % | 96.7 | 95.8 | 96.3 | 95.9 | 97.1 | 96.1 | 95.4 | 96.7 | 96.9 | 98.1 | 96.9 | 96.5 |
| Total Polymer in Product, calc. % | 19.0 | 19.0 | 18.9 | 18.8 | 19.1 | 18.9 | 18.7 | 19.0 | 19.0 | 19.2 | 19.0 | 19.0 |
| Properties | | | | | | | | | | | | |
| Viscosity (Brookfield) 25° C., cps | 1,154 | 1,400 | 2,970 | 2,380 | 1,688 | 2,990 | 1,060 | 1,122 | 3,060 | 3,260 | 1,400 | 1,120 |
| Acid No. (Experimental) | — | — | — | — | — | — | — | — | 0.0108 | 0.0104 | 0.0093 | — |
| Hydroxyl No. (Experimental) | — | — | — | — | — | — | — | — | 40.07 | 39.24 | 39.45 | — |
| Filtration Hindrance: | | | | | | | | | | | | |
| 150 Mesh Screen, % Thru | 100 | 4.47 | — | — | 15.6 | 4.7 | 100 | 100 | 2.0 | 0.83 | 100 | 100 |
| Solids on screen, ppm | 18.9 | 4.47 | — | — | 185.7 | 65,014 | 26.4 | 26.4 | 2,550 | 28,080 | 43.5 | 15 |
| 700 Mesh Screen, Time, sec. | 340 | >1200 | — | — | >1200 | — | >1200 | >1200 | — | — | 263 | >1200 |
| 700 Mesh Screen, % Thru | 100 | 0.92 | — | — | 0.40 | — | 38.2 | 38.2 | — | — | 7.9 | 15.5 |
| Solids on screen, ppm | 33.3 | 10,127 | — | — | 7,639 | — | 72 | 72 | — | — | 273 | 1600 |
| Centrifugible Solids, (wt. %) | 0.54 | 4.01 | 25.76 | 5.10 | 3.31 | 9.52 | 0.09 | 0.75 | 16.21 | — | 1.03 | 1.07 |

(1)Macromonomer comprises a polypropylene oxide-butanol adduct of about 2600 mol. wt. condensed with acrylic acid to provide monoethylenic terminal unsaturation and was used as a stabilizer percursor, vix. - was added to the polyol to form the stabilizer in situ during the preparation of the polymer/polyol.
(2)Crude stabilizer was refined to remove unreacted monomer and macromonomer.

TABLE VIII

| | Example No. | | | | | | | | | | | |
|---|---|---|---|---|---|---|---|---|---|---|---|---|
| | 87 | 88 | 89 | 90 | 91 | 92 | 93 | 94 | 95 | 96 | 97 | 98 |
| Preparation | | | | | | | | | | | | |
| Reaction Temperature, °C. | 120 | 120 | 120 | 120 | 120 | 120 | 120 | 120 | 120 | 120 | 120 | 120 |
| AZO Conc. Wt. % | 1.3 | 1.3 | 1.3 | 1.3 | 1.4 | 1.3 | 1.3 | 1.3 | 1.3 | 1.3 | 1.3 | 1.3 |
| % Monomer | 20 | 20 | 20 | 20 | 20 | 20 | 20.6 | 20 | 20 | 20 | 20 | 20 |
| A/S Ratio | 40/60 | 40/60 | 40/60 | 40/60 | 40/60 | 80/20 | 42/58 | 0/100 | 40/60 | 40/60 | 40.60 | 80/20 |
| Stabilizer composition from Ex. No. | 23 | 23 | 19 | (1) | (1) | 23 | 23 | 25 | 14 | 16 | 17 | — |
| Wt. % Solid | 0.39 | 0.17 | 1.4 | 2.6 | 3.8 | 1.4 | 1.4 | 2.6 | 1.4 | 1.4 | 1.4 | — |
| Monomer Feed Rate, gm/hr | 112 | 1 | 75 | 102 | 102 | 123 | 97 | 75 | 100 | 100 | 100 | 100 |
| Residual Acrylonitrile, % | 0.36 | 0.21 | 0.34 | 0.39 | 0.24 | 0.67 | 0.38 | 0.02 | 0.56 | 0.31 | 1.22 | 0.61 |
| Residual Styrene, % | 0.24 | 0.23 | 0.23 | 0.26 | 0.23 | 0.03 | 0.25 | 3.6 | 0.23 | 0.21 | 0.22 | 0.04 |
| Residual TMSN, % | 0.56 | 0.50 | 0.46 | 0.58 | 0.58 | 0.53 | 0.43 | 0.40 | 0.42 | 0.49 | 0.49 | 0.56 |
| Residual Toluene, % | 0.79 | 0.35 | 0.05 | — | — | 3.03 | 3.07 | 2.96 | 3.29 | 3.93 | 3.12 | — |
| Residual Benzene, % | 0.05 | 0.04 | 2.88 | 0.08 | 0.07 | 0.05 | 0.06 | 0.4 | 0.13 | 0.06 | 0.05 | 0.06 |

TABLE VIII-continued

| | Example No. | | | | | | | | | | | |
|---|---|---|---|---|---|---|---|---|---|---|---|---|
| | 87 | 88 | 89 | 90 | 91 | 92 | 93 | 94 | 95 | 96 | 97 | 98 |
| Conversion Acrylonitrile, % | 95.4 | 97.3 | 95.7 | 95.0 | 96.0 | 91.5 | 95.1 | — | 93.0 | 96.0 | 84.0 | 92.3 |
| Conversion Styrene, % | 97.9 | 98.0 | 98.0 | 97.8 | 98.0 | 99.7 | 97.8 | 81.5 | 98.0 | 98.2 | 98.2 | 96.5 |
| Conversion Combined, % | 96.9 | 96.8 | 97.1 | 96.7 | 97.6 | 96.4 | 96.8 | 81.5 | 96.0 | 97.3 | 92.7 | 96.9 |
| Total Polymer in Product, calc. % | 19.1 | 19.2 | 19.1 | 19.0 | 19.2 | 18.9 | 19.0 | 16.0 | 18.8 | 19.0 | 18.1 | 19.0 |
| Properties | | | | | | | | | | | | |
| Light Transmission % | 77.1 | 77.8 | — | 67.2 | 71.6 | 93.9 | 86.5 | 55.0 | 70.4 | — | 72.1 | 94.9 |
| Viscosity (Brookfield), 25° C., cps | 1,184 | 1,452 | 1,248 | 1,460 | 1,472 | 2,480 | 1,066 | 1,182 | 1,178 | 3,650 | 1,180 | 1,248 |
| Acid No. (Experimental) | — | — | — | — | — | — | — | — | — | — | — | — |
| Hydroxyl No. (Experimental) | — | — | — | — | — | — | — | — | — | — | — | — |
| Filtration Hindrance: | | | | | | | | | | | | |
| 150 Mesh Screen, % Thru | 100 | 27.2 | 49 | 49.2 | 82 | 100 | 100 | 0.83 | 100 | 0.33 | 100 | 100 |
| Solids on screen, ppm | 19.8 | 13.2 | 48 | 48.6 | 19 | 28 | — | — | 18 | — | — | 26 |
| 700 Mesh Screen, | >1200 | >1200 | >1200 | >1200 | >1200 | 488 | >1200 | — | >1200 | — | >1200 | 309 |
| 700 Mesh Screen, % Thru | 9.33 | 1.33 | .17 | 1.67 | 4 | 100 | 62 | — | 20 | — | 32 | 100 |
| Solids on screen, ppm | 455 | 4,388 | 2,610 | 2,610 | 1,425 | 43 | 88 | — | 228 | — | — | 129 |
| Centrifugible Solids, wt. % | 1.12 | 2.4 | 1.6 | 1.95 | 0.9 | 1.2 | 1.0 | 21.4 | 1.2 | 52.4 | 0.8 | 0.8 |

(1) Macromonomer comprises a polypropylene oxide-butanol adduct of about 2600 mol. wt. condensed with acrylic acid to provide monoethylenic terminal unsaturation and was used as a stabilizer precursor.

While an anchor portion formed from an acrylonitrile/sytrene ratio of 30/70 provided effective stabilization for polymer/polyols made with a 40/60 acrylonitrile/styrene ratio (See, e.g.-Example 75), this composition stabilizer was considerably less effective when used with polymer/polyols made with styrene (See Example 94). It can also be seen from a comparison of Example 75 with Examples 90 and 91 that precursors provided less effective stabilization than can be achieved with preformed stabilizers.

EXAMPLES 99–105

These Examples show the preparation of polymer/polyols in 400 molecular weight polyol (Polyol II), using stabilizers in accordance with the present invention.

The results are set forth in Table IX:

TABLE IX

| | Example No. | | | | | | |
|---|---|---|---|---|---|---|---|
| | 99 | 100 | 101 | 102 | 103 | 104 | 105 |
| Preparation | | | | | | | |
| Reaction Temperature, °C. | 120 | 120 | 120 | 120 | 120 | 120 | 120 |
| Wt. % AZO | 1.3 | 1.3 | 1.3 | 1.3 | 1.4 | 1.3 | 1.3 |
| Wt. % Monomer | 20 | 20 | 20 | 20 | 20 | 20 | 20 |
| Ratio of Acrylonitrile to Styrene | 40/60 | 40/60 | 40/60 | 50/50 | 50/50 | 80/20 | 80/20 |
| Stabilizer (1), from Example No. | 21 | 21 | 21 | 21 | 21 | 21 | 20 |
| Wt. % | 5 | 2.5 | 1.3 | 2.1 | 4.76 | 2.5 | 2.5 |
| Ratio Anchor Part, A/S | 30/70 | 30/70 | 30/70 | 30/70 | 30/70 | 30/70 | 75/25 |
| Monomer Feed Rate, gm/hr | 100 | 100 | 100 | 100 | 70 | 100 | 100 |
| Residual Acrylonitrile | 1.23 | 0.98 | 1.0 | 1.26 | 0.33 | 1.67 | 0.21 |
| Residual Styrene | 0.37 | 0.41 | 0.41 | 0.15 | 0.20 | 0.04 | 0.32 |
| Residual TMS | 0.36 | 0.49 | 0.55 | 0.40 | 0.84 | 0.41 | 0.23 |
| Residual Toluene | — | — | — | — | — | — | — |
| Residual Benzene | 0.05 | 0.05 | 0.05 | 0.05 | 0.06 | 0.04 | 1.14 |
| % Conversion Acrylonitrile | 84.3 | 87.7 | 87.2 | 87.2 | 98.2 | 89.3 | 98.5 |
| % Conversion Styrene | 96.9 | 96.7 | 96.7 | 98.5 | 99 | 98.7 | 92 |
| % Conversion Combined | 91.8 | 93.1 | 92.9 | 92.8 | 98.6 | 91.2 | 97.2 |
| Total Polymer in Product, calc. % | 17.8 | 18.5 | 18.5 | 18.5 | 37.4 | 17.7 | 18.9 |
| Properties | | | | | | | |
| Polymer Polyol Stability (inspection) (2) | good | fair | good | good | fair | poor | poor |
| Viscosity (Brookfield), cps | 228 | 193 | 163 | 185 | 1020 | — | — |
| Filtration Hindrance: | | | | | | | |
| 150 Mesh Screen, % Thru | 100 | 23 | 100 | 48 | 4.8 | — | — |
| Solids on screen, ppm | 13 | 21,978 | 29 | 11,110 | 124,023 | — | — |
| 700 Mesh Screen, Time, sec. | 125 | >1200 | >1200 | >1200 | — | — | — |
| % Thru | 100 | 13 | 9 | 5.2 | — | — | — |
| Solids on screen, ppm | 62.4 | 13,091 | 139 | 86,100 | — | — | — |
| Centrifugible Solids, wt. % | 2.2 | 18.3 | 11.8 | 20.6 | 16.5 | — | — |

(1) Solvent was stripped from stabilizer prior to addition to Polyol II.
(2) The product was visually inspected and subjectively evaluated in terms of settling, viscosity and pourality. A rating of "good" indicates that the product was non-setting with sufficiently low viscosity as to be pourable, while a rating of "Poor" indicates that the product was either subject to settling of the dispersed polymer phase or was of a viscosity such that the product was not pourable. A "fair" rating indicates that the product exhibited characteristics intermediate a "poor" and "good" product.

As can be seen from Examples, extremely stable polymer/polyols at about 20 percent polymer content can be formed in a low molecular weight polyol.

EXAMPLES 106–113

These Examples illustrate the preparation of polymer/polyols in Polyol III, which has a molecular weight of about 1000, using preformed stabilizers.

The results are set forth in Table X:

TABLE X

| | Example No. | | | | | | | |
|---|---|---|---|---|---|---|---|---|
| | 106 | 107 | 108 | 109 | 110 | 111 | 112 | 113 |
| Preparation | | | | | | | | |
| Reaction Temperature, °C. | 120 | 120 | 120 | 120 | 120 | 120 | 120 | 120 |
| Wt. % AZO | 1.3 | 1.3 | 1.3 | 1.3 | .13 | 1.3 | 1.3 | 1.3 |
| Wt. % Monomer | 20 | 20 | 20 | 40 | 20 | 20 | 20 | 20 |
| Ratio of Acrylonitrile to Styrene | 40/60 | 40/60 | 50/50 | 50/50 | 80/20 | 80/20 | 75/25 | 50/50 |
| Stabilizer, from Example No. | 21 | 21 | 21 | 21 | 20 | 20 | 20 | 20 |
| Solids (s) or Solution (sol)(1) | sol | sol(2) | s | s | sol | sol | sol | s |
| Wt. % | 1.3 | 3.5 | 2.1 | 4.76 | 1.3 | 1.3 | 1.3 | 2.5 |
| A/S Ratio Anchor Part | 30/70 | 30/70 | 30/70 | 30/70 | 30/70 | 75/25 | 75/25 | 75/25 |
| Monomer Feed Rate, gm/hr | 100 | 100 | 100 | 70 | 100 | 100 | 100 | 100 |
| Residual Acrylonitrile | 0.82 | 0.51 | 0.60 | 0.17 | | 1.25 | 1.26 | 0.51 |
| Residual Styrene | 0.41 | 0.26 | 0.17 | — | | 0.08 | 0.09 | 0.20 |
| Residual TMSN | 0.43 | 0.50 | 0.53 | 0.45 | | 0.54 | 0.49 | 0.53 |
| Residual Toluene | 3.09 | 2.99 | — | — | | 2.91 | 2.75 | 0.01 |
| Residual Benzene | 0.06 | 0.06 | 0.05 | 0.07 | | 0.06 | 0.06 | 0.04 |
| % Conversion Acrylonitrile | 89.6 | 93.5 | 93.9 | 99.0 | | | 91.4 | 94.6 |
| % Conversion Styrene | 96.5 | 97.8 | 98.3 | 100 | | | 98.4 | 97.9 |
| % Conversion Combined | 93.7 | 96.1 | 96.1 | 99.5 | | | 93 | 96.3 |
| Total Polymer in Product, calc. % | 18.6 | 19.0 | 19 | 37.7 | | | 18.5 | 18.7 |
| Properties | | | | | | | | |
| Polymer Polyol Stability (inspection) | fair | good | good | fair | poor | poor | poor | poor |
| Viscosity (Brookfield), cps | 526 | 420 | 368 | 7520 | — | 140,000 | — | — |
| Filtration Hindrance: | | | | | | | | |
| 150 Mesh Screen, % Thru | 86.2 | 100 | 100 | 7 | — | — | — | — |
| Solids on screen, ppm | 1839 | 6 | 27 | 8607 | — | — | — | — |
| 700 Mesh Screen, Time, sec. | >1200 | >1200 | 149 | — | — | — | — | — |
| % Thru | 2.2 | 38 | 100 | — | — | — | — | — |
| Centrifugible Solids, wt. % | 40.5 | 17.5 | 1.0 | 8.3 | — | — | — | — |

(1)In these and subsequent Examples, "solids" indicates the solvent was stripped from the stabilizer prior to the addition to the polyol; "solution" indicates that the solvent was not stripped from the stabilizer.
(2)Part added as solution and part as solid.

As can be seen from Examples 107 and 108, polymer/polyols with satisfactory stability were achieved in the low molecular weight polyol with 40/60 and 50/50 acrylonitrile/styrene monomer systems.

EXAMPLES 114–118

These Examples illustrate the preparation of polymer/polyols from Polyol I and high styrene monomer systems using a 50/50 acrylonitrile/styrene polymer as the anchor portion and a polypropylene oxide-butanol adduct of about 2600 mol. wt. condensed with acrylic acid to provide terminal unsaturation as the solvatable portion. The results are set forth in Table XI:

TABLE XI

| | Example No. | | | | |
|---|---|---|---|---|---|
| | 114 | 115 | 116 | 117 | 118 |
| Preparation | | | | | |
| Reaction Temperature, °C. | 120 | 120 | 120 | 120 | 120 |
| AZO conc. wt. % | 1.3 | 1.3 | 1.3 | 1.3 | 1.3 |
| % Monomer | 20 | 20 | 20 | 20 | 20 |
| A/S Ratio | 30/70 | 25/75 | 10/90 | 5/95 | 0/100 |
| Stabilizer Solid, wt. % | 1.3 | 1.8 | 1.8 | 1.8 | 1.8 |
| Monomer Feed Rate | 75 | 75 | 75 | 75 | 75 |
| Residual Acrylonitrile | 0.30 | 0.167 | 0.07 | 0.03 | — |
| Styrene | 0.78 | 1.49 | 2.96 | 4.04 | 6.25 |
| TMSN | 0.49 | 0.47 | 0.56 | 0.59 | 0.69 |
| Toluene | 2.71 | 0.02 | — | 0 | 0.97 |
| Benzene | 0.04 | 0.19 | 0.04 | — | 0.05 |
| Conversion, Acrylonitrile, % | 94.9 | 96.5 | 96.4 | 97.1 | — |
| Styrene, % | 94.3 | 89.9 | 83.2 | 77.3 | 65.6 |
| Combined, % | 94.5 | 91.3 | 84 | 78.3 | 66.6 |
| Total Polymer in Product, calc. % | 18.6 | 18.0 | 17 | 15.6 | 14 |
| Properties | | | | | |
| Brookfield Viscosity, cps | 994 | 1,068 | 1,200 | 1,040 | 690 |
| Filtration Hindrance: | | | | | |
| 150 Mesh Screen, sec % thru | 100 | 100 | 100 | 100 | — |
| Solids on Screen, ppm | 9.5 | 820 | 44 | 34.8 | — |
| 700 Mesh Screen, sec. | >1200 | >1200 | >1200 | >1200 | — |
| % thru | 55 | 63 | 100 | 54 | — |
| Solids on Screen, ppm | | | 60 | 47 | 1,584 |
| Centrifugible Solids, wt. % | 1.2 | 0.35 | 8.9 | 25.1 | 13.7 |

These Examples demonstrate that satisfctorily stable polymer/polyols can be made with monomer systems having a relatively high styrene content (see Example 116) with stabilizers having anchor portions of appropriate composition.

EXAMPLES 119–124

These Examples show the preparation of polymer/polyols using Polyols I and III, contrasting the preparation using stabilizers in accordance with the present invention with polymer/polyol preparation without employing a preformed stabilizer.

A continuous polymerization system was used, employing a tank reactor fitted with baffles and an impeller. The feed components were pumped to the bottom of the reactor continuously after going through an in-line mixer to assure complete mixing of the feed components before entering the reactor. The internal temperature of the reactor was controlled to within 1° C. by controlled heating or cooling to the outside of the reactor. The product from the top of the reactor flowed out of the top of the reactor to a back pressure regulator adjusted to 10 pounds per square inch gauge back pressure and then through a water cooled tubular heat exchanger to a product receiver. Portions of the crude product were vacuum stripped at 2 millimeters pressure and 120 to 130 degrees C. for testing.

The experimental conditions and results are tabulated in Table XII:

comparison to preparation using only a peroxide catalyst.

EXAMPLES 125–131

TABLE XII

|  | Example No. | | | | | |
|---|---|---|---|---|---|---|
|  | 119 | 120 | 121 | 122 | 123 | 124 |
| Polyol | Polyol I | Polyol I | Polyol I | Polyol III | Polyol III | Polyol III |
| Preparation | | | | | | |
| Reaction Temperature, °C. | 125 | 130 | 125 | 125 | 130 | 120 |
| Catalyst | AZO | TBPO | AZO | AZO | TBPO | AZO |
| Catalyst Conc., wt. % in total feed | 0.5 | 1.0 | 0.5 | 0.5 | 1.0 | 0.44 |
| Stabilizer Conc., wt. % in Polyol feed(1) | 6.045 | — | — | 6.045 | — | — |
| Monomer Content in Feed, wt. % | 19.97 | 20.21 | 12.58 | 20.32 | 20.45 | 7.7 |
| Ratio of Acrylonitrile to Styrene, wt. % | 40/60 | 40/60 | 40/60 | 80/20 | 80/20 | 80/20 |
| Combined Conversion, % | 88.86 | 88.87 | 83.10 | 85.2 | 78.75 | 57.7 |
| Polymer Content, Calc., % | 17.7 | 18.0 | 10.4 | 17.3 | 16.1 | 4.4 |
| Properties | | | | | | |
| Brookfield Viscosity at 25° C., cps | 1120 | 1768 | 2100 | 520 | 610 | (layered) |
| Acid No., mg KOH/gm | 0.068 | 0.051 | — | 0.048 | — | |
| Filtration Hindrance: | | | | | | |
| 150 Mesh Screen, % Through | 100.0 | 100.0 | 100.0 | 100.0 | 100.0 | 8.7 |
| Solids on screen, ppm | 13 | 12 | 3 | 7.0 | 18.0 | 2810 |
| 700 Mesh Screen, Time, sec. | 220 | 190 | 500 | 129 | 123 | >1200 |
| % Through | 100.0 | 100.0 | 0.11 | 100.0 | 100.0 | 1.9 |
| Solids on screen, ppm | 17.0 | 12.0 | 6190 | 10 | 21.0 | — |
| Centrifugible Solids, wt. % | 1.77 | 9.15 | 33.55 | 20.88 | 41.5 | 20.0 |
| Calculated Hydroxyl No., mg KOH/gm | 45.78 | 45.22 | 49.72 | 92.11 | 92.73 | — |

(1)The stabilizer used consisted of an anchor portion formed from a 30/70 acrylonitrile/styrene monomer system and a polypropylene oxide-butanol adduct of about 2600 mol. wt. condensed with methacrylic acid to provide terminal unsaturation as the solvatable portion.

As can be seen from a comparison of Example 119 with Example 121 and Example 122 with Example 124, the use of stabilizers allows the formation of stable polymer/polyols which cannot be prepared by using azo catalysts alone. A comparison of Example 119 with 120 and Example 122 with 123 shows the stabilizers decrease the viscosity and centrifugible solids level in comparison to preparation using only a peroxide catalyst.

These Examples illustrate the preparation of polymer/polyols with a monomer system of acrylonitrile and styrene and/or methyl methacrylate as comonomers using the procedure set forth in Examples 119–124, except that Polyol IV was used.

The experimental conditions and results are tabulated in Table XIII:

TABLE XIII

| | Example No. | | | | | | |
|---|---|---|---|---|---|---|---|
| | 125 | 126 | 127 | 128 | 129 | 130 | 131 |
| Preparation | | | | | | | |
| Reaction Temperature, °C. | 120 | 120 | 125 | 120 | 120 | 120 | 120 |
| AZO Conc., Wt. % in total feed | 0.5 | 0.5 | 0.5 | 0.5 | 0.5 | 0.5 | 0.5 |
| Stabilizer(1) | | | | | | | |
| Stabilizer, wt. % solids in total feed(1) | 2.89 | 2.77 | 2.64 | 2.94 | 2.94 | 2.82 | 2.0 |
| Monomer + AZO Content in Feed, wt. % | 19.90 | 23.40 | 26.8 | 29.5 | 30.4 | 33.3 | 20.26 |
| Ratio of Methyl Methacrylate/ Acrylonitrile/Styrene, wt. % | 25/25/50 | 25/25/50 | 25/25/50 | 25/25/50 | 25/25/50 | 25/25/50 | 60/40/0 |
| Polyol + Stabilizer Feed Rate, gm/hr | 2204 | 2210 | 2016 | 1938 | 1978 | 1830 | 2196 |
| Monomer + AZO Feed Rate, gm/hr | 548 | 646 | 738 | 812 | 866 | 914 | 558 |
| Product Weight, gm/hr | 2736 | 2748 | 2746 | — | 2845 | 2724 | 2742 |
| Material Balance, % | 99.40 | 99.70 | 99.7 | — | 100.0 | 99.30 | 99.56 |
| Residual Acrylonitrile, % | 0.77 | 0.98 | 0.93 | Reactor | 0.647 | 1.05 | 1.44 |
| Methyl Methacrylate, % | 1.07 | 1.03 | 1.15 | Plugged - | 0.869 | 1.26 | 2.31 |
| Styrene, % | 1.48 | 1.55 | 1.66 | Run Not | 1.158 | 1.68 | — |
| TMSN, % | 0.21 | 0.29 | 0.28 | Completed | 0.227 | 0.28 | 0.278 |
| Toluene, % | 0.13 | 0.20 | 0.20 | | 0.374 | 0.16 | 0.155 |
| Conversions, Acrylonitrile, % | 84.20 | 82.9 | 85.9 | | 91.3 | 97.3 | 81.9 |
| Methyl Methacrylate, % | 78.10 | 82.0 | 82.6 | | 88.4 | 84.5 | 80.6 |
| Styrene, % | 84.80 | 86.5 | 87.4 | | 92.3 | 89.8 | — |
| Combined, % | 83.00 | 84.5 | 85.8 | | 91.1 | 87.9 | 87.1 |
| Total Poly A in Product by Calc., wt. % | 4.2 | 4.9 | 5.9 | | 7.00 | 7.5 | 6.7 |
| Total Poly MMA in Product by Calc., wt. % | 3.9 | 4.9 | 5.6 | | 7.00 | 7.2 | 9.9 |
| Total Poly S in Product by Calc., wt. % | 8.5 | 10.2 | 11.9 | | 6.8 | 15.4 | — |
| Total Polymer in Product by Calc., wt. % | 16.6 | 20.0 | 23.4 | | 14.2 | 30.1 | 16.6 |
| Properties | | | | | | | |
| Viscosity (Brookfield) at 25° C., cps | 1268 | 1364 | 1484 | | 28.0 | 2280 | 900 |
| Calculated Hydroxyl No., gm KOH/gm | 38.8 | 37.30 | 35.7 | | 2000 | 32.6 | 46.16 |
| Filtration Hindrance(2) | | | | | 33.5 | | |
| 150 Mesh Screen, % Thru | 8.72 | 100 | 100 | | 100 | 66.8 | 100 |
| Solids on Screen, ppm | 3990 | 6 | 16 | | 4.9 | 198 | 11 |
| 700 Mesh Screen, time, sec. | 500 | 1200 | 450 | | 1200 | 600 | 170 |
| % Thru | 0.9787 | 33.19 | 15.8 | | 13 | 2.55 | 100 |
| Solids on Screen, ppm | 38630 | 31.40 | 111 | | 142 | 6250 | 7 |
| Centrifugible Solids, wt. % | 1.77 | 1.85 | 2.27 | Suspecting use of 80/20 acrylonitrile/styrene mix for start up. | 2.52 Reaction was started at low monomer conc. and then increased gradually. | 2.99 Reaction was started using a 25/25/50 MMA/A/S mix instead of 80/20 A/S mix. | 1.2 |
| Remarks | Noticed increase in viscosity of the product during line-out period. | | | | | | |

(1)The stabilizers were as follows:
Examples 125–130: A 30/70 acrylonitrile/styrene monomer ratio used to form the anchor portion and a polypropylene oxide-butanol adduct of about 2600 mol. wt. condensed with acrylic acid to provide terminal unsaturation as the solvatable constituent.
Example 131: Same as in Examples 125–130, except that a 50/50 acrylonitrile/styrene monomer ratio was used to form the anchor portion.
(2)In Example 130, Cellosolve solvent (ethylene glycol monoethyl ether) was used rather than isoproponal.

As can be seen from Examples 126 and 131, stable polymer/polyols can be formed when methyl methacrylate is substituted for part or all of the styrene in the monomer system.

EXAMPLES 132–147

These Examples show preparation of further polymer/polyols using the process set forth in connection with Examples 119–124.

The experimental conditions and results are set forth in Table XIV:

TABLE XIV

| | \multicolumn{16}{c}{Example No.} |
|---|---|---|---|---|---|---|---|---|---|---|---|---|---|---|---|---|
| | 132 | 133 | 134 | 135 | 136 | 137 | 138 | 139 | 140 | 141 | 142 | 143 | 144 | 145 | 146 | 147 |
| Polyol | Polyol I | | | | | | | Polyol IV | | | | | Polyol V | | | |
| Reaction Temperature, °C.(1) | 125 | 125 | 125 | 125 | 125 | 120 | 120 | 125 | 125 | 125 | 125 | 125 | 125 | 125 | 125 | 125 |
| Stabilizer(2) | | | | | | | | | | | | | | | | |
| Conc., wt. % in total feed | 1.2 | 1 | 2 | 2.8 | 2.54 | 2.69 | 2.82 | 2 | 2 | 2 | 1.82 | 1.77 | 4.66 | 4.47 | 4.3 | 4.08 |
| AZO, conc., wt. % in total feed | 1.0 | 0.5 | 0.5 | 0.5 | 0.5 | 0.5 | 0.5 | 0.5 | 0.5 | 0.5 | 0.5 | 0.58 | 1.3 | 1.3 | 1.3 | 1.3 |
| Monomer Content in Feed, wt. % | 20.54 | 20.39 | 20.12 | 23.18 | 30.49 | 26.35 | 33.43 | 20.32 | 20.36 | 20.07 | 23.74 | 27.46 | 20.70 | 23.99 | 27.9 | 30.7 |
| Ratio of Acrylonitrile to Styrene, wt. % | 40/60 | 40/60 | 40/60 | 40/60 | 40/60 | 40/60 | 40/60 | 30/70 | 25/75 | 20/80 | 30/70 | 30/70 | 30/70 | 30/70 | 30/70 | 30/70 |
| Polyol Feed Rate, gm/hr | 2190 | 2194 | 2160 | 2108 | 1960 | 2012 | 1844 | 2204 | 2206 | 2206 | 2004 | 2002 | 2221 | 2144 | 2018 | 1948 |
| Monomer Feed Rate, gm/hr | 566 | 562 | 544 | 636 | 860 | 720 | 926 | 562 | 564 | 554 | 624 | 758 | 580 | 677 | 780 | 862 |
| Product Weight, gm/hr | 2742 | 2746 | 2690 | 2732 | 2814 | 2724 | 2753 | 2756 | 2756 | 2749 | 2612 | 2752 | 2784 | 2806 | 2786 | 2786 |
| Material Balance, % | 99.49 | 99.64 | 99.48 | 99.56 | 99.79 | 99.71 | 99.38 | 99.64 | 99.49 | 99.42 | 99.39 | 99.71 | 99.39 | 99.47 | 99.57 | 99.14 |
| Residual Acrylonitrile, % | 0.85 | 1.08 | 1.20 | 1.16 | 1.02 | 0.99 | 0.93 | 0.846 | 0.834 | 0.773 | 0.95 | 0.94 | 0.78 | 0.75 | 0.7 | 0.85 |
| Styrene, % | 0.95 | 1.21 | 1.28 | 1.25 | 0.91 | 0.95 | 1.25 | 2.05 | 2.69 | 3.77 | 2.25 | 2.22 | 1.55 | 1.64 | 1.66 | 1.57 |
| TSMN, % | 0.24 | 0.27 | 0.26 | 0.20 | 0.20 | 0.26 | 0.219 | 0.221 | 0.210 | 0.194 | 0.234 | 0.277 | 0.6 | 0.55 | 0.57 | 0.57 |
| Conversions, Acrylonitrile, % | 89.2 | 86.5 | 84.8 | 87.2 | 91.5 | 90.5 | 93.0 | 85.8 | 83.3 | 80.4 | 86.5 | 88.5 | 86.7 | 89.0 | 90.5 | 90.4 |
| Styrene, % | 91.9 | 89.9 | 89.2 | 90.9 | 94.9 | 93.9 | 93.7 | 85.3 | 82.0 | 76.1 | 86.2 | 88.2 | 89.7 | 89.7 | 91.1 | 92.4 |
| Combined, % | 90.8 | 88.5 | 87.4 | 89.4 | 93.6 | 92.5 | 93.4 | 85.4 | 82.3 | 76.9 | 86.3 | 88.3 | 89.5 | 89.5 | 90.9 | 91.8 |
| Total Poly A in Product by Calc., wt. % | 7.1 | 7.0 | 6.8 | 8.1 | 11.20 | 9.5 | 12.5 | 5.3 | 4.3 | 3.3 | 6.20 | 7.4 | 5.2 | 6.2 | 7.4 | 8.2 |
| Total Poly S in Product by Calc., wt. % | 11.0 | 11.0 | 10.8 | 12.7 | 17.40 | 14.9 | 18.9 | 12.2 | 12.7 | 12.5 | 14.5 | 17.1 | 12.4 | 14.6 | 17.4 | 19.5 |
| Total Polymer in Product by Calc. wt. % | 18.1 | 18.0 | 17.6 | 20.8 | 28.6 | 24.4 | 31.4 | 17.5 | 17.0 | 15.8 | 20.7 | 24.5 | 17.5 | 20.8 | 24.8 | 27.7 |
| Properties | | | | | | | | | | | | | | | | |
| Brookfield Viscosity at 25° C., cps. | 936 | 928 | 1220 | 1440 | 2948 | 2744 | 3210 | 1280 | 1636 | 2640 | 1420 | 2104 | 1012 | 1160 | 1180 | 1720 |
| Acid No., mg/KOH/gm | — | — | — | — | — | — | — | — | — | — | — | — | — | — | — | — |
| Calculated Hydroxyl No., mg. KOH/gm | 45.4 | 45.4 | 38.4 | 36.8 | 33.3 | 35.2 | 31.94 | 38.47 | 38.70 | 39.2 | 36.93 | 35.2 | 46.5 | 42.4 | 42.4 | 40.8 |
| Filtration Hindrance(3): | | | | | | | | | | | | | | | | |
| 150 Mesh Screen, % thru | 100 | 100 | 100 | 100 | 100 | 100 | 100 | 100 | 100 | 100 | 100 | 100 | 100 | 100 | 100 | 100 |
| Solids on Screen, ppm | 10 | 9 | 3.4 | 13 | 14838 | 3951 | 6 | 21.13 | 21 | 33.4 | 53 | 48 | 8 | 6 | 6 | 13 |
| 700 Mesh Screen, time, sec. | 140 | 138 | 206 | 330 | 300 | 1200 | 600 | 600 | 1200 | 500 | 436 | 500 | 188 | 210 | 218 | 600 |
| % thru | 100 | 100 | 100 | 100 | 0.14 | 0.07 | 1.67 | 17.87* | 64.04* | 19.79 | 24 | 0.85 | 100 | 100 | 100 | 70 |
| Solids on screen, ppm | 5 | 214 | 12.3 | 17 | 129696 | 84848 | 691 | 116 | 21 | 409 | 842 | 20900 | 32 | 12 | 7 | 4 |
| Centrifugible Solids, wt. % | 1.75 | 1.93 | 1.59 | 1.48 | 12.4 | 12.69 | 5.53 | 2.22 | 7.80 | 31.19 | 2.72 | 14.92 | 1.9 | 2.6 | 3.2 | 4.3 |

(1)Temperatures held within about ± 1.5° C.
(2)The Stabilizers used were as follows: Examples 132–138: As identified in Examples 125–130. Examples 139–143: As identified in Example 131. Examples 144–147: Anchor portion was made from a 50/50 acrylonitrile/styrene monomer system and a polypropylene oxide-butanol adduct of about 2600 mol. wt. condensed with methacrylic acid to provide terminal unsaturation as the solvatable portion.
(3)Cellusolve solvent was used in place of isoporpanol in Example 142–143.

While relatively stable polymer/polyols can be made from monomer systems with relatively high styrene contents, Examples 144–147 demonstrate that, ignoring any possible effect created by the change in polyol, stability is improved by significantly increasing the stabilizer concentration, allowing preparation of stable polymer/polyols with 70% styrene in the monomer system at polymer contents up to 27.7%.

The experimental conditions and results are tabulated in Table XV:

TABLE XV

| | Example No. | | | | | | | |
|---|---|---|---|---|---|---|---|---|
| | 148 | 149 | 150 | 151 | 152 | 153 | 154 | 155 |
| Preparation | | | | | | | | |
| Reaction Temperature °C. | 120 | 120 | 120 | 120 | 120 | 120 | 120 | 120 |
| Polyol | I | I | I | IV | IV | V | V | V |
| AZO Concentration, wt. % | 1.5 | 1.8 | 2.1 | 1.5 | 2.1 | 1.8 | 2.1 | 2.1 |
| % Monomer | 24 | 28 | 33.3 | 24 | 33.3 | 28 | 33.3 | 36 |
| A/S Ratio | 30/70 | 30/70 | 30/70 | 30/70 | 30/70 | 30/70 | 30/70 | 30/70 |
| Stabilizer(1) | | | | | | | | |
| Solid Stabilizer, wt. % | 2.0 | 2.52 | 3 | 3 | 3 | 2.5 | 3 | 3 |
| Monomer Feed Rate, gm/hr | 60 | 60 | 60 | 60 | 60 | 60 | 60 | 60 |
| Residual Acrylonitrile | 0.27 | 0.12 | 0.19 | 0.28 | 0.25 | 0.28 | 0.23 | 0.33 |
| Styrene | 0.50 | 0.73 | 0.88 | 0.98 | 0.67 | 0.94 | 1.01 | 1.19 |
| TMSN | 0.70 | 0.78 | 0.92 | 0.76 | 0.83 | 0.71 | 1.00 | 0.89 |
| Toluene | — | — | — | — | — | — | — | — |
| Benzene | 0.06 | 0.07 | 0.10 | 0.08 | 0.08 | 0.08 | 0.01 | 0.09 |
| Conversion, Acrylonitrile, % | 96.2 | 98.5 | 98.0 | 96.0 | 97.4 | 96.6 | 97.6 | 96.8 |
| Styrene, % | 97.0 | 96.1 | 96.1 | 94.3 | 97.0 | 95.1 | 95.5 | 95.1 |
| Combined, % | 96.7 | 96.9 | 96.7 | 94.8 | 97.2 | 95.5 | 96.1 | 95.6 |
| Total Polymer in Product, wt. % | 22.7 | 26.4 | 31.2 | 22.2 | 31.3 | 26.0 | 31 | 33 |
| Properties | | | | | | | | |
| Brookfield Viscosity, cps. | 1,616 | 1,616 | 2,800 | 3,128 | 7,440 | 1,988 | 2,640 | 3,500 |
| Filtration Hindrance | | | | | | | | |
| 150 Mesh Screen, sec. | | | | | | | | |
| % thru | 28 | 100 | — | 4.2 | 11.7 | 29 | — | — |
| 700 Mesh Screen, | >1200 | >1200 | — | — | >1200 | >1200 | — | — |
| % thru | 4.3 | 7.7 | — | — | 0.7 | 1.7 | — | — |
| Solids on Screen, ppm | 323 | 365 | — | — | 5475 | — | — | — |
| Centrifugible Solids, wt. % | 2.73 | 1.29 | 1.82 | 2.86 | 8.12 | 1.67 | 2.37 | 3.29 |

(1)Described in Example 131.

EXAMPLES 148–155

These Examples demonstrate the preparation of polymer/polyols having relatively high polymer contents (viz.—24 to 36%) at acrylonitrile/styrene ratios of 30/70.

While the filtration hindrance characteristics are substantially less than optimum, polymer/polyols with satisfactory viscosity and centrifugible solids characteristics were formed in all the Examples.

EXAMPLES 156–159

These Examples further illustrate the preparation of polymer/polyols using Polyol I and a monomer system in which methyl methacrylate is employed with various styrene and acrylonitrile monomer systems and also acrylonitrile and styrene alone.

The experimental conditions and the properties are set forth in Table XVI:

TABLE XVI

| Example No. | 156 | 157 | 158 | 159 |
|---|---|---|---|---|
| Preparation | | | | |
| Reaction Temperature, °C. | 120 | 120 | 120 | 120 |
| AZO Concentration, % by wt. | 1.3 | 1.0 | 1.0 | 1 |
| Stabilizer, from Example | 21 | 21 | 125–130 | 131 |
| Concentration of Stabilizer (wt. %) | 1.3 | 1.3 | 1.3 | 2 |
| Monomer(s), wt. % | 20 | 20 | 20 | 20 |
| Acrylonitrile/Methyl Methacrylate/Styrene, ratio | 25/25/50 | 15/25/60 | 0/40/60 | 40/60/0 |
| Residual Acrylonitrile, % | 0.27 | 0.21 | 0.07 | 0.39 |
| Styrene, % | 0.48 | 0.65 | 1.74 | 0.61 |
| TMSN, % | 0.49 | 0.46 | 0.45 | 0.45 |
| Toluene, % | — | — | 2.47 | 0.13 |
| Benzene, % | 0.38 | 0.22 | 0.88 | — |
| Conversions, Acrylonitrile, % | 94.6 | 95.7 | — | 95.1 |
| Methyl Methacrylate, % | — | — | — | 94.8 |
| Styrene, % | 95.7 | 94 | 79.3 | 94.9 |
| Combined, % | 95 | 94.5 | 80 | |
| Total Polymer in Product, wt. % | 19 | 18.9 | 16 | 18.8 |
| Properties | | | | |
| Viscosity (Brookfield), cps at 25° C. | 1,240 | 1,000 | 1,286 | 1,144 |
| Filtration Hindrance: | | | | |
| 150 Mesh Screen, sec. | 7 | 11 | 1200 | |
| % Thru | 100 | 100 | 1.8 | 100 |
| Solids on Screen, ppm | 48 | 25 | 29,890 | 53 |
| 700 Mesh Screen, sec. | 360 | 360 | — | 307 |
| % Thru | 100 | 100 | — | 100 |

TABLE XVI-continued

| Example No. | 156 | 157 | 158 | 159 |
|---|---|---|---|---|
| Solids on Screen | 89 | 50 | — | 140 |
| Centrifugible Solids, wt. % | 1.8 | 1.9 | 11.8 | 0.96 |

With the stabilizers used, as can be seen by comparing Example 158 with the other Examples, a less stable polymer/polyol is formed when no acrylonitrile is used in the monomer system.

EXAMPLES 160–164

These Examples show the preparation of polymer/polyols in Polyol I with a monomer system containing relatively high styrene content.

The experimental conditions and resulting properties are set forth in Table XVII:

This further illustrates the formation of stable polymer/polyols using high styrene in the monomer system.

EXAMPLES 165–171

These Examples illustrate the preparation of polymer/polyols in Polyol V, employing the procedure described in connection with Examples 119–124, and compare the efficacy of stabilizers made from a solvatable portion having terminal unsaturation (Examples 168–171) and those made without terminal unsaturation (Examples 165–167).

TABLE XVII

| Example No. | 160 | 161 | 162 | 163[1] | 164[1] |
|---|---|---|---|---|---|
| Preparation | | | | | |
| Reaction Temperature, °C. | 120 | 120 | 120 | 120 | 120 |
| AZO, wt. % | 1.3 | 1.3 | 1.3 | 1.3 | 1.3 |
| Stabilizer, wt. %[2] | 1.3 | 1.8 | 1.8 | 1.8 | 1.8 |
| Monomer, wt. % | 20 | 20 | 20 | 20 | 20 |
| Monomer A/S ratio | 40/60 | 25/75 | 20/80 | 10/90 | 5/95 |
| Monomer Catalyst Feed Rate, gm/hr | 75 | 75 | 75 | 75 | 75 |
| Residual Acrylonitrile, % | 0.44 | 0.14 | 0.14 | 0.07 | 0.03 |
| Styrene, % | 0.30 | 1.42 | 2.39 | 2.96 | 4.04 |
| TMSN, % | 0.56 | 0.47 | 0.52 | 0.56 | 0.59 |
| Toluene, % | 2.58 | 0.45 | 0 | 0 | 0 |
| Conversion, Acrylonitrile, % | 94.4 | 97.2 | 96.4 | 96.4 | 97.1 |
| Styrene, % | 97.5 | 90.4 | 87.0 | 83.2 | 77.3 |
| Combined, % | 96.3 | 92.1 | 89.44 | 84.0 | 78.3 |
| Poly A in Product by Calc., wt. % | 7.5 | 4.8 | 3.8 | 1.8 | 1.0 |
| Poly S in Product by Calc., wt. % | 11.5 | 13.2 | 13.3 | 14.7 | 14.6 |
| Total Polymer in Product by Calc., wt. % | 19 | 18 | 17.1 | 16.5 | 15.6 |
| Properties | | | | | |
| Viscosity (Brookfield) at 25° C., cps | 1,160 | 944 | 1,076 | 1,200 | 1,040 |
| Filtration Hindrance: | | | | | |
| 150 Mesh Screen, % thru | 100 | — | — | 100 | 100 |
| Solids on Screen, ppm | 31 | — | — | 44.4 | 34.8 |
| 700 Mesh Screen, time, sec. | >1200 | — | — | >1200 | >1200 |
| % thru | 40 | — | — | 99 | 54 |
| Solids on Screen, ppm | 110.8 | | | 48.6 | 1,584 |
| Centrifugible Solids wt. % | 0.7 | 0.25 | 0.38 | 8.9 | 25.1 |

[1]Examples 117 and 118, respectively. Reproduced herein for purposes of comparison.
[2]Stabilizer described in Examples 114–118.

The experimental conditions and results are tabulated in Table XVIII:

TABLE XVIII

| Example No. | 165 | 166 | 167 | 168[1] | 169[1] | 170[1] | 171[1] |
|---|---|---|---|---|---|---|---|
| Preparation | | | | | | | |
| Reaction Temperature, °C.[2] | 125 | 125 | 125 | 125 | 125 | 125 | 125 |
| AZO, conc., wt. % in total feed | 1.3 | 1.3 | 1.3 | 1.3 | 1.3 | 1.3 | 1.3 |
| Stabilizer Conc., wt. % in total feed[3] | 4.34 | 4.16 | 3.97 | 4.66 | 4.47 | 4.3 | 4.08 |
| Monomer ∂ AZO Content in Feed, wt. % | 20.70 | 24.04 | 27.55 | 20.70 | 23.99 | 27.88 | 30.68 |
| Ratio of Acrylonitrile to Styrene, wt. % | 30/70 | 30/70 | 30/70 | 30/70 | 30/70 | 30/70 | 30/70 |
| Polyol ∂ Stabilizer Feed Rate, gm/hr | 2206 | 2123 | 2020 | 2221 | 2144 | 2018 | 1940 |
| Monomer ∂ AZO Feed Rate, gm/hr | 576 | 672 | 768 | 580 | 677 | 780 | 862 |
| Product Weight, gm/hr | 2759 | 2779 | 2770 | 2784 | 2806 | 2786 | 2786 |
| Material Balance, % | 99.17 | 99.43 | 99.35 | 99.39 | 99.47 | 99.57 | 99.14 |
| Residual Acrylonitrile, % | 0.66 | 0.69 | 0.70 | 0.78 | 0.75 | 0.76 | 0.85 |
| Styrene, % | 1.51 | 1.63 | 1.70 | 1.55 | 1.64 | 1.66 | 1.57 |
| TMSN, % | 0.54 | 0.70 | 0.60 | 0.61 | 0.55 | 0.57 | 0.55 |
| Toluene, % | — | — | — | 0.83 | 0.84 | 0.71 | 0.79 |
| m-xylene, % | 0.43 | 10.43 | 0.43 | — | — | — | — |
| Conversion, Acrylonitrile, % | 88.8 | 90.0 | 91.2 | 86.7 | 89.0 | 90.5 | 90.4 |
| Styrene, % | 89.0 | 89.8 | 90.8 | 88.7 | 89.7 | 91.1 | 92.4 |
| Combined, % | 88.9 | 89.9 | 90.9 | 88.1 | 89.5 | 90.9 | 91.8 |
| Total Poly A in Product by Calc., wt. % | 5.30 | 6.29 | 7.37 | 5.19 | 6.22 | 7.41 | 8.18 |
| Total Poly S in Product by Calc., wt. % | 12.39 | 14.67 | 17.14 | 32.38 | 14.63 | 17.40 | 19.51 |
| Total Polymer in Product by Calc., wt. % | 17.69 | 20.96 | 24.51 | 17.56 | 20.85 | 24.81 | 27.69 |
| Properties | | | | | | | |

TABLE XVIII-continued

| Example No. | 165 | 166 | 167 | 168[1] | 169[1] | 170[1] | 171[1] |
|---|---|---|---|---|---|---|---|
| Brookfield Viscosity at 25° C., cps | 960 | 1096 | 1176 | 1012 | 1160 | 1180 | 1720 |
| Acid No., mg KOH/gm | — | — | 0.028 | — | — | — | — |
| Calculated Hydroxyl No., mg KOH/gm | 46.42 | 44.58 | 42.57 | 46.49 | 44.64 | 42.41 | 40.78 |
| Filtration Hindrance: | | | | | | | |
| 150 Mesh Screen, % thru | 100 | 100 | 4.5 | 1000 | 100 | 100 | 100 |
| Solids on Screen, ppm | 1 | 13 | 1544 | 8 | 9 | 6 | 13 |
| 700 Mesh Screen, time, sec. | 320 | 300 | 300 | 188 | 210 | 218 | 600 |
| Solids on Screen, ppm | 9 | 8 | 0.5 | 100 | 100 | 100 | 70 |
| Centrifugible Solids, wt. % | 3.94 | 6.33 | 11.04 | 1.90 | 2.65 | 3.66 | 4.33 |

[1] Examples 144–147, respectively. Reproduced herein for purposes of comparison.
[2] Temperatures held within about ± 1.5° C.
[3] The stabilizer used for Examples 165–167 is described in Example 34.

As can be seen, both types of stabilizers are effective although, at the concentrations utilized, a comparison of Example 170 with Example 167 shows that the stabilizers having unsaturation in the solvatable portion provide improved results when the polymer content is higher at similar stabilizer levels.

EXAMPLES 172–187

These Examples show the use of polymer/polyols to prepare flexible foams.

Examples 172–173 and 176–177, wherein the polymer/polyols were prepared using stabilizers in accordance with the present invention, can be contrasted with the remaining Examples wherein the polymer/polyols were prepared either with a peroxide or an azo catalyst and no stabilizer. The experimental conditions are tabulated in Table XIX:

TABLE XIX

| Example No. | 172 | 173 | 174 | 175 | 176 | 177 | 178 | 179 | 180 |
|---|---|---|---|---|---|---|---|---|---|
| Polymer/Polyol | | | | | | | | | |
| Polyol | Polyol V | | | | | | | Polyol I | Polyol V |
| Hydroxyl No., mg KOH/g | 45.47 | 45.56 | 44.63 | 42.41 | 40.78 | 45.12 | 42.7 | 37.5 | |
| A/S Ratio | 30/70 | 30/70 | 30/70 | 30/70 | 30/70 | 30/70 | 40/60 | 50/50 | 78/22 |
| Solids Content, wt. % | 19.35 | 19.20 | 20.98 | 20.86 | 24.81 | 27.69 | 18.04 | 18 | 32.94 |
| Catalyst | AZO + Stabilizer[1] | AZO + Stabilizer | TBPO | TBPO | AZO + Stabilizer | AZO + Stabilizer | TBPO | AZO | TBPO |
| Amount of Stabilizer | 4.2 | 4.5 | 0 | 0 | 4.3 | 4.1 | 0 | 0 | 0 |
| Foam Formulation | | | | | | | | | |
| Polymer/Polyol | 100 | 100 | 100 | 100 | 100 | 100 | 100 | 100 | 60 |
| Polyol V | — | — | — | — | — | — | — | — | 40 |
| Water | 4.0 | 4.0 | 4.0 | 4.0 | 4.0 | 4.0 | 4.0 | 4.0 | 4.0 |
| Catalyst | 0.10 | 0.10 | 0.13 | 0.13 | 0.10 | 0.10 | 0.10 | 0.10 | 0.1 |
| Stannous Octoate | 0.175 | 0.25 | 0.25 | 0.25 | 0.25 | 0.25 | 0.175 | 0.25 | 0.2 |
| Silicone Surfactant | 1.0 | 1.0 | 1.0 | 1.0 | 1.0 | 1.0 | 1.0 | 1.0 | 1.0 |
| Isocyanate TDI 107 Index | 48.8 | 48.8 | 48.8 | 48.8 | 48.2 | 43.7[2] | 48.8 | 48.8 | 47.5 | 49. |
| Rise Time, secs. | 147 | 139 | Creams and gel very fast. | Gels slowly, split and collapsed. | 0130 | 164 | 110 | 114 | 105 |
| Comments | OK | OK | Top splits and powdery foam. | | Small split. | OK | OK | OK |

[1] The stabilizers used were as follows:
Example 172: described in Example 34.
Examples 173, 176 and 177: described in Example 131.
[2] Index of 98.

As can be seen by comparing Examples 172 and 173 with Examples 174 and 175 (where no stabilizer was used), satisfactory foams were prepared with the 30/70 acrylonitrile/styrene polymer/polyols made with the stabilizer while top splits and powdery foams resulted from use of the polymer/polyols prepared with a peroxide catalyst and no stabilizer.

The physical properties of the foams which were tested are tabulated in Table XX:

TABLE XX

| Example No. | 181 | 182 | 183 | 184 | 185 | 186 | 187 |
|---|---|---|---|---|---|---|---|
| Foam Preparation, Example | 172 | 173 | 177 | 178 | 179 | 180 | 180 |
| Density, pcf | 1.58 | 1.53 | 1.54 | 1.53 | 1.52 | 1.54 | 1.50[1] |
| Air Porosity, ft³min/ft² | 84.5 | 82.3 | 66.5 | 76.4 | 80.6 | 50.0 | 86.0 |
| Resiliency, % ball rebound | 32 | 32 | 27 | 32 | 36 | 23 | 32 |
| HD (lbs/50 in²)[2] | | | | | | | |
| 25% | 59.1 | 56.1 | 59.9 | 52.7 | 65.0 | 91.3 | 55.2 |
| 65% | 113.3 | 106.0 | 115.3 | 104.3 | 117.3 | 170.0 | 99.0 |
| 25% Return, % | 57.2 | 56.0 | 51.4 | 55.6 | 56.1 | 46.2 | 54.9 |
| Load Ratio | 1.92 | 1.89 | 1.92 | 1.98 | 1.80 | 1.86 | 1.79 |
| Tensile Strength, psi | 16.3 | 17.9 | 16.5 | 17.9 | 17.6 | 23.1 | 18.4 |
| Elongation, % | 83 | 108 | 78 | 112 | 98 | 87 | 120 |
| Tear Resistance, pH | 1.29 | 1.73 | 1.32 | 2.04 | 1.70 | 2.05 | 2.39 |
| 90% Compression Set, $C_d$, % | 10.7 | 12.6 | 17.3 | 15.9 | 7.7 | 59.0 | 8.1 |

[1] Formulation based on 60 parts of the Polymer/Polyol prepared in Example 179 and 40 parts of Polyol V for total polymer solids contents of 19.76 percent.
[2] Specimen dimensions of 12 × 12 × 4 inches.

The ILD values in all instances were satisfactory.

EXAMPLES 188–191

These Examples illustrate the improvement in discoloration resistance with foams prepared from polymer/polyols in which the acrylonitrile/styrene ratio has been reduced from 50/50 to 40/60 and 30/70.

The foams evaluated were made using the polymer/polyols described in Table XXI:

TABLE XXI

| Formulation | Polymer/Polyol A | Polymer/Polyol B | Polymer/Polyol C | Polymer/Polyol D |
|---|---|---|---|---|
| Polyol | IV | IV | IV | IV |
| A/S Ratio | 50/50 | 40/60 | 30/70 | 30/70 |
| Total Polymer Content | 18 | 18 | 17.13 | 18.01 |
| Viscosity, cps, at 25° C. | 1500 | 3000 | 1464 | 6420 |
| Catalyst | AZO | TBPO | AZO | TBPO |
| Stabilizer[1] | No | No | Yes | No |

[1]The stabilizer used is described in Example 131.

Foams were prepared using polymer/polyols A-D, and the foam formulations and the resulting discoloration characteristics are set forth in Table XXII:

TABLE XXII

| Example No. | 188 | 189 | 190 | 191 |
|---|---|---|---|---|
| Polymer/Polyol | A | B | C | D |
| phr | | | | |
| Water | 100.0 | 100.0 | 100.0 | 100.0 |
| | 6.0 | 6.0 | 6.0 | 6.0 |
| Urethane Catalyst | 0.07 | 0.07 | 0.07 | 0.07 |
| Silicone Surfactant II | 1.2 | 1.2 | 1.2 | 1.2 |
| Stannous Octoate | 0.20 | 0.20 | 0.20 | 0.20 |
| TDI Index | 105 | 105 | 105 | 105 |
| Height of Rise, inches | 26.0 | 25.3 | 24.0 | 24.0 |
| Nopco Breathability, SCFM | 3.25 | 1.30 | 1.95 | 2.25 |
| Density, pcf | 1.02 | 1.04 | 1.11 | 1.09 |
| Reflectometer Readings: | | | | |
| Top | 59.3 | 71.5 | 78.3 | 74.6 |
| Middle | 56.8 | 71.5 | 77.4 | 72.7 |
| Bottom | 61.8 | 74.6 | 78.9 | 76.2 |
| Bottom-Center | 5.0 | 3.1 | 1.5 | 3.5 |

As can be seen, the data shows a general trend of decreased scorch with decreased acrylonitrile content in the monomer system used to form the polymer/polyols.

EXAMPLES 192–195

These Examples illustrate the use of various anchor portion compositions in preparing polymer/polyols using the procedure described in Examples 119-124 and with a 40/60 acrylonitrile/styrene monomer system. The solvatable portion in Examples 193-195 consisted of polypropylene oxide material III condensed to form an acrylate. Polypropylene oxide material III was used in Example 192 without modification.

The experimental conditions and results are tabulated in Table XXIII:

TABLE XXIII

| Example No. | 192 | 193 | 194 | 195 |
|---|---|---|---|---|
| Polyol | IV | IV | IV | I |
| Preparation | | | | |
| Reaction Temperature, °C. | 125 | 125 | 125 | 125 |
| AZO conc., wt. % in total feed | 0.5 | 0.5 | 0.5 | 0.5 |
| Stabilizer Anchor Portion, ratio of Acrylonitrile/Styrene | 45/55 | 45/55 | 50/50 | 30/70 |
| Stabilizer, wt. % in total feed | 2.48 | 2.0 | 2.0 | 2.0 |
| Monomer and AZO content in feed, wt. % | 20.54 | 20.65 | 20.59 | 19.97 |
| Ratio of Acrylonitrile/Styrene, wt. % | 40/60 | 40/60 | 40/60 | 40/60 |
| Residual Acrylonitrile, % | 1.03 | 1.13 | 1.19 | 1.08 |
| Syrene, % | 1.05 | 1.63 | 1.67 | 1.48 |
| TMSN, % | 0.29 | 0.231 | 0.25 | 0.21 |
| M-xylene, % | 0.31 | — | — | — |
| Conversion, Acrylonitrile, % | 87.17 | 86.04 | 85.24 | 86.14 |
| Styrene, % | 91.28 | 86.57 | 86.19 | 87.34 |
| Combined, % | 89.64 | 86.36 | 85.81 | 86.86 |
| Total Polyacrylonitrile in Product, by calc. wt. % | 7.12 | 7.13 | 7.05 | 6.89 |
| Total Polystyrene in Product, by calc. wt. % | 11.19 | 10.77 | 10.70 | 10.48 |
| Total Polymer in Product, by calc. wt. % | 18.31 | 17.90 | 17.75 | 17.37 |
| Properties | | | | |
| Viscosity (Brookfield) at 25° C., cps | 1228 | 1260 | 1320 | 1120 |
| Calculated Hydroxyl No., mg KOH/gm | 38.15 | 38.34 | 38.41 | 45.78 |
| Filtration Hindrance; | | | | |
| 150 Mesh Screen, % thru | 100 | 41.06 | 100 | 100 |
| Solids on Screen, ppm | 6 | 38 | 16 | 13 |
| 700 Mesh Screen, time, sec. | 600 | 300 | 300 | 220 |
| % thru | 8 | 6.6 | 12.76 | 100 |
| Solids on Screen, ppm | 6 | 316 | 65 | 17 |
| Centrifugible Solids, wt. % | 1.83 | 1.81 | 1.85 | 1.77 |

While the viscosity and centrifugible solids level of all of the polymer/polyols were satisfactory, only the Example 195 polymer/polyol exhibited the preferred filtration hindrance characteristics.

EXAMPLES 196–199

These Examples show the effect of increasing the amount of monomer used in preparing a 40/60 acrylonitrile/styrene polymer/polyol.

The experimental conditions and results are tabulated in Table XXIV:

TABLE XXIV

| Example No. | 196 | 197 | 198 | 199 |
|---|---|---|---|---|
| Polyol | V | V | V | V |
| Preparation | | | | |
| Reaction Temperature, °C. | 125 | 125 | 125 | 125 |
| AZO conc., wt. % in total feed | 1.3 | 1.3 | 1.3 | 1.3 |
| Stabilizer Anchor Portion, ratio of | | | | |

TABLE XXIV-continued

| Example No. | 196 | 197 | 198 | 199 |
|---|---|---|---|---|
| Acrylonitrile/Styrene[1] | 30/70 | 30/70 | 30/70 | 30/70 |
| Stabilizer, wt. % in total feed | 5.65 | 5.11 | 4.74 | 4.37 |
| Monomer and AZO content in feed, wt. % | 32.17 | 38.60 | 43.13 | 47.56 |
| Ratio of Acrylonitrile to Styrene, wt. % | 40/60 | 40/60 | 40/60 | 40/60 |
| Residual Acrylonitrile, % | 1.07 | 0.75 | 1.12 | 1.03 |
| Styrene, % | 1.25 | 0.84 | 1.09 | 0.95 |
| TMSN, % | 0.65 | 0.47 | 0.65 | 0.63 |
| Toluene, % | — | — | — | — |
| Conversion, Acrylonitrile, % | 91.46 | 95.0 | 93.42 | 94.45 |
| Styrene, % | 93.34 | 96.27 | 95.73 | 96.59 |
| Combined, % | 92.59 | 95.77 | 94.80 | 95.74 |
| Total Polyacrylonitrile in Product, by calc. wt. % | 11.59 | 14.42 | 16.0 | 17.85 |
| Total Polystyrene in Product, by calc. wt. % | 17.75 | 21.92 | 24.59 | 27.38 |
| Total Polymer in Product, by calc. wt. % | 29.34 | 36.34 | 40.59 | 45.23 |
| Product Properties | | | | |
| Viscosity (Brookfield) at 25° C., cps | 3310 | 8800 | 11960 | 35500 |
| Calculated Hydroxyl No., mg KOH/gm | 39.85 | 35.90 | 33.50 | 30.89 |
| Filtration Hindrance: | | | | |
| 150 Mesh Screen, % thru | 100 | 100 | 100 | 5.84 |
| Solids on Screen, ppm | 12 | 22 | 13 | 2374 |
| 700 Mesh Screen, Lime, sec. | 212 | 210 | 218 | 300 |
| % thru | 100 | 100 | 100 | 0.335 |
| Solids on Screen, ppm | 13 | 15 | 14 | 31493 |
| Centrifugible Solids, wt. % | 2.51 | 5.16 | 5.56 | 21.21 |

[1] Solvatable portion comprised a polypropylene oxide-butanol adduct of about 2600 mol. wt. condensed with acrylic acid to provide terminal unsaturation.

As can be seen from Example 196–198, while the viscosity increased with increasing monomer content, acceptable filtration hindrance was provided, up to a polymer content of about 40 percent.

EXAMPLES 200–211

These Examples illustrate the preparation of polymer/polyols using Polyol V, from a monomer system with high styrene content and with various stabilizers and with varying monomer system contents.

Experimental conditions and results are tabulated in Table XXV:

TABLE XXV

| Example No. | 200 | 201 | 202 | 203 | 204 | 205 | 206 | 207 | 208 | 209 | 210 | 211 |
|---|---|---|---|---|---|---|---|---|---|---|---|---|
| Preparation | | | | | | | | | | | | |
| Reaction Temperature, °C. | 125 | 125 | 125 | 125 | 125 | 125 | 125 | 125 | 125 | 125 | 125 | 125 |
| AZO conc., wt. % in total feed | 1.3 | 1.3 | 1.30 | 1.49 | 1.3 | 1.3 | 1.3 | 1.3 | 1.3 | 1.3 | 1.3 | 1.3 |
| Stabilizer Anchor Portion, ratio of Acrylonitrile/Styrene | 55/45 | 55/45 | 30/70 | 30/70 | 50/50 | 50/50 | 50/50 | 50/50 | 50/50 | 50/50 | 50/50 | 50/50 |
| Stabilizer, wt. % in total feed, | 4.64 | 4.45 | 4.63 | 4.45 | 4.64 | 4.45 | 4.23 | 4.05 | 4.69 | 4.04 | 4.23 | 4.07 |
| Monomer and AZO content in feed, wt. % | 21.01 | 24.37 | 21.22 | 24.39 | 21.0 | 24.37 | 28.03 | 31.14 | 20.14 | 24.52 | 28.05 | 30.76 |
| Ratio of Acrylonitrile/Styrene, wt. % | 30/70 | 30/70 | 30/70 | 30/70 | 30/70 | 30/70 | 30/70 | 30/70 | 30/70 | 30/70 | 30/70 | 30/70 |
| Residual Acrylonitrile, % | 0.62 | 0.61 | 0.75 | 0.71 | 0.76 | 0.81 | 0.78 | 0.78 | 0.74 | 0.76 | 0.75 | 0.79 |
| Styrene, % | 1.07 | 1.37 | 1.95 | 1.87 | 1.92 | 2.08 | 2.26 | 2.06 | 1.93 | 2.02 | 1.87 | 2.04 |
| TMSN, % | 0.43 | 0.47 | 0.60 | 0.69 | 0.62 | 0.61 | 0.61 | 0.65 | 0.54 | 0.61 | 0.59 | 0.65 |
| Xylene, % | 0.68 | 0.30 | — | — | — | — | — | — | — | — | — | — |
| Conversions, Acrylonitrile, % | | | | | | | | | | | | |
| Styrene, % | 92.32 | 91.53 | 85.88 | 88.35 | 86.17 | 87.14 | 88.06 | 90.17 | 85.50 | 87.65 | 90.05 | 90.15 |
| Combined, % | 91.51 | 91.44 | 86.32 | 88.75 | 86.47 | 87.49 | 88.76 | 90.52 | 85.95 | 88.10 | 90.24 | 90.43 |
| Total Polyacrylonitrile in Product, by calc. wt. % | 5.40 | 6.44 | 5.37 | 6.33 | 5.31 | 6.30 | 7.49 | 8.43 | 5./08 | 6.39 | 7.49 | 8.30 |
| Total Polystyrene in Product, by calc. wt. % | 12.98 | 15.10 | 12.33 | 14.56 | 12.24 | 14.51 | 17.01 | 19.41 | 11.64 | 14.66 | 17.35 | 19.17 |
| Total Polymer in Product, by calc. wt. % | 18.38 | 21.54 | 17.70 | 20.89 | 17.55 | 20.81 | 24.50 | 27.84 | 16.72 | 21.05 | 24.84 | 27.47 |
| Product Properties | | | | | | | | | | | | |
| Viscosity (Brookfield) at 25° C., cps | 1700 | 2264 | 1122 | 1290 | 994 | 1130 | 1260 | 1828 | 970 | 1166 | 1298 | 1504 |
| Calculated Hydroxyl No., mg KPH/gm | 46.03 | 44.25 | 46.41 | 44.62 | 46.5 | 44.66 | 42.58 | 40.70 | 46.97 | 44.53 | 42.39 | 40.91 |
| Filtration Hindrance | | | | | | | | | | | | |
| 150 Mesh Screen, % thru | 100 | 7 | 100 | 100 | 100 | 100 | 100 | 2.66 | 100 | 100 | 100 | 100 |
| Solids on Screen, ppm | 17 | 2186 | 13 | 9 | 52 | 15 | 31 | 4605 | 10 | 16 | 17 | 27 |
| 700 Mesh Screen, time, sec. | 300 | 15 | 196 | 176 | 208 | 290 | 1200 | — | 211 | 275 | 245 | 1200 |
| % thru | 1.16 | 0.15 | 100 | 100 | 100 | 100 | 46.67 | — | 100 | 100 | 100 | 42.34 |
| Solids on Screen, ppm | 2112 | 97333 | 13 | 5 | 3 | 10 | 32 | — | 13 | 13 | 13 | 37 |
| Centrifugible Solids, | 17.43 | 49.72 | 1.45 | 1.77 | 3.57 | 5.18 | 6.28 | 21.35 | 1.77 | 2.11 | 2.46 | 3.73 |

TABLE XXV-continued

| Example No. | 200 | 201 | 202 | 203 | 204 | 205 | 206 | 207 | 208 | 209 | 210 | 211 |
|---|---|---|---|---|---|---|---|---|---|---|---|---|
| stripped wt. % | | | | | | | | | | | | |

(1)Solvatable portions comprised:
Examples 200–201: Polypropylene oxide material III
Examples 202–203: Polypropylene oxide material III condensed with acrylic acid to provide terminal monoethylenic saturation
Examples 204–207: Polypropylene oxide material IV
Examples 208–211: Polypropylene oxide material IV condensed with acrylic acid to provide terminal monoethylenic unsaturation Stabilizers are effective, as can be seen, for example, from Examples 204 and 211, regardless of whether or not the solvatable portion was made from a macromonomer condensed with acrylic acid. Somewhat more stable polymer/polyols at higher polymer contents can, however, be achieved at approximately equivalent stabilizer contents with the acrylate mode as can be seen by comparing Examples 206 and 207 with Examples 210 and 211.

EXAMPLES 212–217

These Examples illustrate the preparation of polymer/polyols using Polyol V, with stabilizers prepared with 30/70 and 50/50 acrylonitrile/styrene anchor portions and with varying solvatable portions.

The polypropylene oxide material used for Examples 212–215 was material III and was a monohydroxyl propylene oxide produced from propylene oxide and butanol; the average molecular weight for the polypropylene oxide material of Examples 216 and 217 was about 2555. In Examples 212–213, the macromonomer was prepared by condensing 1 mole of maleic anhydride per 1 mole of the polypropylene oxide material; in Examples 214–215, 1 mole of TDI was reacted with 1 mole of the polypropylene oxide material, followed by reaction of 1 mole of hydroxyethylacrylate per mole of the TDI-polypropylene oxide material reaction product; and, in Examples 216–217, 1 mole of TDI per 2 moles of the polypropylene oxide material were reacted to form the solvatable portion.

Experimental conditions and results are set forth in Table XXVI:

TABLE XXVI

| | Example No. | | | | | |
|---|---|---|---|---|---|---|
| | 212 | 213 | 214 | 215 | 216 | 217 |
| Preparation | | | | | | |
| Reaction Temperature, °C. | 120 | 120 | 120 | 120 | 120 | 120 |
| AZO conc., wt. % | 1.0 | 1.0 | 1.0 | 1.0 | 1.0 | 1.0 |
| Stabilizer Anchor Portion, Acrylonitrile/Styrene ratio | 30/70 | 50/50 | 30/70 | 50/50 | 30/70 | 50/50 |
| Stabilizer wt. % | 1.3 | 1.8 | 1.3 | 1.8 | 1.3 | 1.8 |
| Linkage Species (a) | (1) | (1) | (2) | (2) | (3) | (3) |
| Ratio of Acrylonitrile/Styrene in Monomer System | 40/60 | 30/70 | 40/60 | 30/70 | 40/60 | 30/70 |
| Monomers, wt. % | 20 | 20 | 20 | 20 | 20 | 20 |
| Residual Acrylonitrile, % | 0.22 | 0.08 | 0.27 | 0.10 | 0.40 | 0.02 |
| Styrene, % | 0.34 | 0.77 | 0.41 | 0.82 | 0.42 | 0.4 |
| TMSN, % | 0.46 | 0.50 | 0.51 | 0.38 | 0.45 | 0.40 |
| Toluene, % | 3.22 | 0.5 | 2.16 | 0.4 | 2.49 | 0.88 |
| Benzene, % | — | — | | | | |
| Conversion, Acrylonitrile, % | 96.1 | 98.6 | 95.3 | 98.3 | 93.0 | 99.7 |
| Styrene, % | 97.4 | 94.4 | 97.0 | 94.0 | 96.9 | 97.1 |
| Combined, % | 97.0 | 95.6 | 96.5 | 95.3 | 95.7 | 97.8 |
| Total Polymer in Product | 19.2 | 18.6 | 19.0 | 18.6 | 19.0 | 19.0 |
| Product Properties | | | | | | |
| Viscosity (Brookfield) | 1,100 | 1,068 | 1,360 | 1,186 | 1,196 | 1,044 |
| Filtration Hindrance | | | | | | |
| 150 Mesh Screen, % thru | 100 | 100 | 100 | 100 | 30.2 | 100 |
| Solids on Screen, ppm | 24 | 46 | 92 | 48 | 151 | 12 |
| 700 Mesh Screen, time, sec. | >1200 | >1200 | >1200 | 520 | >1200 | >1200 |
| % thru | 30.8 | 34.8 | 12.7 | 100 | 3.3 | 57 |
| Solids on Screen, ppm | 102 | 445 | 260 | 27 | 1425 | 17 |
| Centrifugible Solids, wt. % | 0.98 | 0.78 | 0.96 | 0.97 | 0.12 | 1.13 |

(a) (1) denotes maleic anhydride
(2) denotes toluene diisocyanate with hydroxyethylacrylate
(3) denotes condensation with acrylic acid As shown, the stabilizers using the various techniques to form the macromonomer provide satisfactory stabilization. The technique of Examples 216–217 provides a further processing advantage in that stabilizers of the free radical mode can be formed at relatively lower temperatures, e.g., 100° C.

EXAMPLES 218–224

These Examples show the use of stabilizers wherein terminal ethylenic unsaturation in the macromonomer was accomplished by conventional ester interchange or transesterification and illustrate the effectiveness of these stabilizers in relation to stabilizers produced using acrylic acid condensed with polypropylene oxide material III and also as compared to stabilizers formed by the free radical grafting mode.

Experimental conditions and results are displayed in Table XXVII:

TABLE XXVII

| | Example No. | | | | | | |
|---|---|---|---|---|---|---|---|
| | 218 | 219 | 220 | 221 | 222 | 223 | 224 |
| Preparation | | | | | | | |
| Reaction Temperature, °C. | 120 | 120 | 120 | 120 | 120 | 120 | 120 |
| AZO conc., wt. % | 1.0 | 1.0 | 1.0 | 1.0 | 1.3 | 1.3 | 1.3 |
| Stabilizer Anchor Portion, | | | | | | | |
| Acrylonitrile/Styrene ratio | 30/70 | 30/70 | 50/50 | 40/60 | 45/55 | 50/50 | 30/70 |
| Stabilizer, wt. % | 1.3 | 1.3 | 1.3 | 1.3 | 4.3 | 1.3 | 1.3 |
| Linkage Species (a) | (1) | (1) | (1) | (2) | (2) | (3) | (3) |
| Ratio of Acrylonitrile/Styrene | | | | | | | |
| in Monomer System | 40/60 | 40/60 | 30/70 | 40/60 | 30/70 | 30/70 | 40/60 |
| Monomers, wt. % | 20 | 20 | 20 | 20 | 20 | 20 | 20 |
| Residual Acrylonitrile, % | 0.36 | 0.33 | 0.08 | 0.28 | 0.66 | 0.3 | 0.35 |
| Styrene, % | 0.36 | 0.37 | 0.69 | 0.70 | 1.51 | 0.78 | 0.22 |
| TMSN, % | 0.45 | 0.51 | 0.4 | 0.62 | 0.54 | 0.49 | 0.46 |
| Toluene, % | 2.59 | 2.34 | — | — | — | 2.71 | 2.58 |
| Benzene, % | | | | | | | |
| Conversion, Acrylonitrile, % | 95.2 | 95.6 | 99.0 | 96.4 | 88.8 | 94.9 | 95.9 |
| Styrene, % | 96.8 | 96.3 | 93.8 | 94.0 | 89.0 | 94.3 | 98.1 |
| Combined, % | 96.3 | 96.2 | 95.9 | 94.8 | 88.9 | 94.5 | 97.1 |
| Total Polymer in Product | 19.0 | 19.0 | 18.9 | 18.7 | 17.69 | 18.6 | 19 |
| Product Properties | | | | | | | |
| Viscosity (Brookfield) | 4,000 | 3,230 | 27,800 | 1,030 | 960 | 994 | 1,116 |
| Filtration Hindrance | | | | | | | |
| 150 Mesh Screen, % thru | 100 | 100 | 5.8 | 71.2 | 100 | 100 | 100 |
| Solids on Screen, ppm | 77 | 79 | 1,953 | 62 | 1 | 9.5 | 33 |
| 700 Mesh Screen, time, sec. | >1200 | >1200 | — | >1200 | 320 | >1200 | 610 |
| % thru | 37.3 | 5.7 | — | 4.5 | 100 | 55 | 100 |
| Solids on Screen, ppm | 194 | 179 | 000 | 1,311 | 9 | 47 | 54 |
| Centrifugible Solids, wt. % | 1.6 | 1.9 | 5.9 | 1.6 | 3.9 | 1.3 | 0.56 |

(a) (1) denotes transesterification using ethyl acrylate
(2) denotes free radical mode
(3) denotes condensation with acrylic acid Example 218 demonstrates that utilizing transesterification provides a further useful alternative technique for preparing satisfactory stabilizers.

EXAMPLES 225–233

These Examples show the effect on stability of polymer/polyols prepared from a 40/60 acrylonitrile/styrene monomer system in Polyol I caused by varying the composition of the anchor portion of the stabilizer. The solvatable portion was formed by condensing polypropylene oxide material III with acrylic acid.

The experimental conditions and results are tabulated in Table XXVIII:

TABLE XXVIII

| | Example No. | | | | | | | | |
|---|---|---|---|---|---|---|---|---|---|
| | 225 | 226 | 227 | 228 | 229 | 229 | 230 | 231 | 232 |
| Preparation | | | | | | | | | |
| Reaction Temperature, °C. | 120 | 120 | 120 | 120 | 120 | 120 | 120 | 120 | 120 |
| AZO conc., wt. % | 1 | 1 | 1 | 1.3 | 0.78 | 1.3 | 0.78 | 0.78 | 1 |
| Stabilizer Anchor Portion, | | | | | | | | | |
| Acrylonitrile/Styrene ratio | 0/100 | 10/90 | 20/80 | 30/70 | 40/60 | 50/50 | 60/40 | 70/30 | 80/20 |
| Stabilizer, wt. % | 1.3 | 1.3 | 1.3 | 1.4 | 1.3 | 1.3 | 1.3 | 1.3 | 1.3 |
| Ratio of Acrylonitrile/Styrene | | | | | | | | | |
| in Monomer System | 40/60 | 40/60 | 40/60 | 40/60 | 40/60 | 40/60 | 40/60 | 40/60 | 40/60 |
| Monomers, wt. % | 20 | 20 | 20 | 20 | 20 | 20 | 20 | 20 | 20 |
| Residual Acrylonitrile, % | 0.24 | 0.51 | 0.46 | 0.35 | 0.45 | 0.44 | 0.45 | 0.43 | 0.56 |
| Styrene, % | 0.17 | 0.14 | 0.16 | 0.22 | 0.17 | 0.30 | 0.16 | 0.21 | 0.18 |
| TMSN, % | 0.43 | 0.39 | 0.48 | 0.46 | 0.45 | 0.56 | 0.47 | 0.35 | 0.50 |
| Toluene, % | 2.95 | 3.39 | 3.57 | 2.58 | 3.66 | 2.58 | 2.95 | 3.00 | 3.12 |
| Conversion, Acrylonitrile, % | 96.8 | 93.3 | 94.0 | 95.9 | 94.0 | 94.4 | 94.0 | 94.3 | 92.6 |
| Styrene, % | 98.5 | 98.8 | 98.6 | 98.1 | 98.6 | 97.5 | 98.6 | 98.2 | 98.4 |
| Combined, % | 97.7 | 96.5 | 96.8 | 97.1 | 96.8 | 96.3 | 96.8 | 96.7 | 96.1 |
| Total Polymer in Product, % | 19.4 | 19.2 | 19.1 | 19.0 | 19.1 | 19 | 19.1 | 19.0 | 19.0 |
| Product Properties | | | | | | | | | |
| Viscosity (Brookfield), 25° C., cps | 4,600 | 7,860 | 1,528 | 1,666 | 1,680 | 1,160 | 1,150 | 1,124 | 1,528 |
| Filtration Hindrance: | | | | | | | | | |
| 150 Mesh Screen, % thru | 4.2 | 8.0 | 25.3 | 100 | 9.7 | 100 | 100 | 40 | 100 |
| Solids on Screen, ppm | 15,426 | 2,231 | 254 | 33.3 | 652 | 31 | 33 | 51 | 48 |
| 700 Mesh Screen, time, sec. | — | — | >1200 | 610 | — | >1200 | >1200 | >1200 | >1200 |
| % thru | — | — | 0.83 | 100 | — | 40 | 12.3 | 2.0 | 6.2 |
| Solids on Screen, ppm | — | — | 30,000 | 54 | — | 111 | 681 | 2,875 | 3,984 |
| Centrifugible Solids, wt. % | 14 | 8.5 | 34.0 | 0.56 | 3.3 | 0.7 | 1.1 | 1.2 | 1 |

As seen, Example 228 demonstrates that a 30/70 acrylonitrile/styrene anchor portion is to be preferred for a 40/60 acrylonitrile/styrene polymer/polyol. However, as seen from Examples 229 and 233, anchor portion compositions with increasing acrylonitrile content up to 80/20 provide polymer/polyols with satisfactory viscosity and centrifugible solids contents at the stabilizer levels used.

EXAMPLES 234-242

These Examples show the effect on the stability of a polymer/polyol prepared from a 20/80 acrylonitrile/styrene monomer system in Polyol I of varying the composition (i.e.—acrylonitrile/styrene ratio) of the anchor portion. The solvatable portion was made by condensing polypropylene oxide material III with acrylic acid.

The experimental conditions and results are contained in Table XXIX:

TABLE XXIX

| | Example No. | | | | | | | | |
|---|---|---|---|---|---|---|---|---|---|
| | 234 | 235 | 236 | 237 | 238 | 239 | 240 | 241 | 242 |
| Preparation | | | | | | | | | |
| Reaction Temperature, °C. | 120 | 120 | 120 | 120 | 120 | 120 | 120 | 120 | 120 |
| AZO conc., wt. % | 1 | 1 | 1 | 1 | 0.78 | 1.0 | 0.78 | 0.78 | 0.78 |
| Stabilizer Anchor Portion, | | | | | | | | | |
| Acrylonitrile/Styrene ratio | 0/100 | 10/90 | 20/80 | 30/70 | 40/60 | 50/50 | 60/40 | 70/30 | 80/20 |
| Stabilizer, wt. % | 1.8 | 1.8 | 1.8 | 1.8 | 1.8 | 1.8 | 1.8 | 1.8 | 1.8 |
| Ratio of Acrylonitrile/Styrene | 20/80 | 20/80 | 20/80 | 20/80 | 20/80 | 20/80 | 20/80 | 20/80 | 20/80 |
| Monomers, wt. % | 20 | 20 | 20 | 20 | 20 | 20 | 20 | 20 | 20 |
| Residual Acrylonitrile, % | 0.11 | 0.08 | 0.09 | 0.03 | 0.10 | 0.14 | 0.16 | 0.14 | 0.15 |
| Styrene, % | 2.47 | 1.84 | 1.94 | 2.94 | 2.37 | 2.39 | 2.42 | 2.45 | 2.57 |
| TMSN, % | 0.51 | 0.5 | 0.5 | 0.58 | 0.43 | 0.52 | 0.44 | 0.37 | 0.43 |
| Toluene, % | — | — | — | — | — | — | — | — | — |
| Conversion, Acrylonitrile, % | 97.1 | 98.0 | 97.7 | 99.2 | 97.4 | 96.4 | 95.9 | 96.4 | 96.2 |
| Styrene, % | 84.2 | 88.2 | 87.6 | 81.1 | 84.7 | 84.7 | 84.3 | 84.3 | 83.5 |
| Combined, % | 86.8 | 90.2 | 90.2 | 84.8 | 87.2 | 87.1 | 86.6 | 86.7 | 86 |
| Total Polymer in Product, % | 16.9 | 17.6 | 17.4 | 16.5 | 17.0 | 17.0 | 16.9 | 16.9 | 16.8 |
| Product Properties | | | | | | | | | |
| Viscosity (Brookfield), 25° C., cps | 1,460 | 3,950 | 1,228 | 830 | 890 | 1,076 | 2,088 | 1,228 | 1,632 |
| Filtration Hindrance: | | | | | | | | | |
| 150 Mesh Screen, % thru | 100 | 68.3 | 100 | 43 | 100 | — | 0.6 | 2.8 | 0.8 |
| Solids on Screen, ppm | 30 | 306 | 34 | 725 | 44 | — | 225,975 | 163,253 | 86,000 |
| 700 Mesh Screen, time, sec. | >1200 | >1200 | >1200 | >1200 | >1200 | — | — | — | — |
| % thru | 32.5 | 13.3 | 2.7 | 0.33 | 9.7 | — | — | — | — |
| Solids on Screen, ppm | 477 | 172 | 1406 | 281,560 | 284 | — | — | — | — |
| Centrifugible Solids, wt. % | 28.6 | 44.2 | 10.9 | 30.0 | 1.3 | 0.38 | 61.4 | 51.6 | 53.6 |

The centrifugible solids characteristics of the polymer/polyols prepared in Examples 238 and 239 in comparison to the other Examples indicate that, for optimum stabilization, an anchor portion of 40/60 to 50/50 acrylonitrile/styrene is to be preferred.

EXAMPLES 243-245

These Examples demonstrate the stabilization in a 40/60 A/S ratio polymer/polyol in Polyol I by a stabilizer wherein the anchor portion comprised acrylonitrile and a comonomer other than styrene. The solvatable portion was formed by condensing polypropylene oxide material III with acrylic acid.

Experimental conditions and results are contained in Table XXX:

TABLE XXX

| | Example No. | | |
|---|---|---|---|
| | 243 | 244 | 245 |
| Preparation | | | |
| Reaction Temperature, °C. | 120 | 120 | 120 |
| AZO conc. wt. % | 1 | 1 | 1 |
| Stabilizer Anchor Portion, | | | |
| Acrylonitrile/Comonomer ratio (a) | 40/60(1) | 40/60(2) | 40/60(3) |
| Stabilizer, wt. % | 1.3 | 1.3 | 1.3 |
| Ratio of Acrylonitrile/Styrene in Monomer System | 40/60 | 40/60 | 40/60 |
| Monomers, wt. % | 20 | 20 | 20 |
| Residual Acrylonitrile, % | 0.28 | 0.43 | 0.38 |
| Styrene, % | 0.34 | 0.34 | 0.25 |
| TMSN, % | 0.47 | 0.43 | 0.49 |
| Toluene, % | 3.28 | 3.34 | 3.48 |
| Conversion, Acrylonitrile, % | 96.3 | 94.3 | 95.0 |
| Styrene, % | 97.0 | 97.0 | 97.8 |
| Combined, % | 96.7 | 95.9 | 96.7 |
| Total Polymer in Product, % | 19.1 | 18.9 | 19.0 |
| Product Properties | | | |
| Viscosity (Brookfield), 25° C., cps | 1,200 | 3,100 | 3,700 |
| Filtration Hindrance | | | |
| 150 Mesh Screen, % thru | 100 | 5 | 4.3 |
| Solids on Screen, ppm | 71 | 2,269 | 1,558 |
| 700 Mesh Screen, time, sec. | 1200 | — | — |
| % thru | 4.5 | — | — |
| Solids on Screen, ppm | 944 | — | — |
| Centrifugible Solids, wt. % | 1.4 | 6.48 | 49.5 |

(a) Comonomer was:
(1) ethylacrylate,
(2) methylmethacrylate and
(3) vinyl acetate.

The data indicates that optimum stabilization is achieved using ethyl acrylate as the comonomer for the anchor in preference to the other comonomers used.

EXAMPLES 246-251

These Examples show the preparation of stabilizers of the present invention in the equipment described in connection with Examples 119–124, followed by the use of the thus-prepared stabilizers to form polymer/polyols in the same equipment.

The experimental conditions and results are set forth in Table XXXI, the solvent, solvatable portion and catalyst being added as one stream and the monomers used being added as the other stream:

TABLE XXXI

| | Example No. | | |
|---|---|---|---|
| | 246 | 247 | 248 |
| Solvatable Portion of Stabilizer | Polypropylene oxide material V | (1) | Polypropylene oxide material V |
| Amount of Solvatable Portion, wt. % in total feed | 23.49 | 21.903(2) | 24.18 |
| Amount of Solvent (Toluene), wt. % in total feed | 46.99 | 65.754 | 48.35 |
| Catalyst Type | TBPO | TBPO | Di-t-butyl peroxide |
| Catalyst Conc., wt. % in total feed | 1.4 | 1.8 | 1.45 |
| Ratio of Acrylonitrile to Styrene for anchor portion, wt. % | 50/50 | 30/70 | 30/70 |
| Total Monomer Content, wt. % in total feed | 28.11 | 10.51 | 26.02 |
| Ratio of Vinyl Monomers to Solvatable Portion in Feed | 54.48/45.52 | 32.43/67.57 | 51.83/48.17 |
| Reaction Temperature, °C. | 135–140 | 125 | 140 |
| Toluene + Solvatable Portion + Catalyst Feed Rate, gm/hr | 1087 | 1635 | 1055 |
| Monomer Feed Rate, gm/hr | 425 | 192 | 371 |
| Residual Acrylonitrile, % | 5.34 | 1.53 | — |
| , Styrene, % | 2.45 | 3.76 | — |
| Conversion Acrylonitrile, % | 61.40 | 52.41 | — |
| , Styrene, % | 82.29 | 49.87 | — |
| , Combined % | 77.21 | 50.63 | — |
| Total Poly A in Unstripped Product by Calc., wt. % | 9.37 | 1.74 | — |
| Total Poly S in Unstripped Product by Calc., wt. % | 12.56 | 3.87 | — |
| Total Polymer in Unstripped Product by Calc., wt. % | 21.93 | 5.61 | — |
| Ratio of Vinyl Polymer to Soluble Portion by Calc., wt. % | 46.22/53.78 | 20.41/79.6 | — |
| Properties | | | |
| Solids (Nonvolatiles), wt. % (by analysis) | 44.66 | 29.33 | 40.09 |
| Calculated Solids (nonvolatiles), wt. % | 44.39 | 27.22 | — |
| Remarks | Stable | Stable | Stable |

(1) Reaction product of 2 moles of a polypropylene oxide-butanol adduct of about 2550 molecular weight and 1 mole of TDI in toluene.
(2) On solvent-free basis.

The thus formed stabilizers were then used to form acrylonitrile/styrene polymer/polyols in the same equipment. A blend of the stabilizer and the polyol was added as one stream and the monomer system and catalyst were added as the other stream.

The experimental conditions and results are set forth in Table XXXII:

TABLE XXXII

| | Example No. | | |
|---|---|---|---|
| | 249 | 250 | 251 |
| Type of Polyol | V | (1) | (1) |
| Reaction Temperature, °C. | 125 | 125 | 125 |
| AZO, wt. % in total feed | 1.3 | 0.8 | 0.64 |
| Stabilizer, Example | 246 | 247 | 248 |
| Stabilizer, wt. % in total feed | 4.63 | 5.62 | 5.27 |
| Monomer + Content in Feed, wt. % | 21.27 | 32.55 | 40/60 |
| Ratio of Acrylonitrile to Styrene, wt. % | 30/70 | 40/60 | 40/60 |
| Polyol + Stabilizer Feed Rate, gm/hr (2) | 2198 | 1898 | 1946 |
| Monomer + AZO Feed Rate, gm/hr | 594 | 916 | 826 |
| Product Weight, gm/hr | 2778 | 2806 | 2752 |
| Material Balance, % | 99.5 | 99.71 | 99.28 |
| Residual Acrylonitrile, %, | 0.77 | 1.23 | 1.44 |
| , Styrene, % | 2.29 | 1.30 | 1.73 |
| , TSMN, % | 0.61 | 0.41 | 0.28 |
| Conversions, Acrylonitrile, %, | 87.21 | 90.34 | 87.74 |
| , Styrene, % | 83.71 | 92.30 | 90.18 |
| , Combined, % | 84.76 | 92.06 | 89.21 |
| Total Poly A in Product by Calc., wt. % | 5.40 | 11.78 | 11.51 |
| Total Poly S in Product by Calc., wt. % | 12.09 | 18.23 | 17.75 |
| Total Polymer in Product by Calc., wt. % | 17.49 | 30.01 | 29.26 |
| Properties | | | |
| Brookfield Viscosity at 25° C., cps. | 1010 | 2336 | 1928 |
| Calculated hydroxyl No., mg. KOH/gm | 43.92 | 36.75 | 37.38 |
| Filtration Hindrance: | | | |
| 150 Mesh Screen, % through | 100 | 100 | 100 |
| solids on screen, ppm | 65 | 28 | 49 |
| 700 Mesh Screen, time, sec. | 227 | 1200 | 800 |
| % through | 100 | 67.66 | 100 |
| solids on screen, ppm | 29 | 79 | 12 |
| Centrifugible Solids, wt. % (7) | 1.47 | 2.82 | 2.43 |

(1) 85/15 blend of a (a) polypropylene oxide trial having 8% internal ethylene oxide content, a number average molecular weight of about 2700 and a hydroxyl number of about 62, and (b) polypropylene oxide triol capped with about 14% ethylene oxide, having a number average molecular weight of about 6000 and a hydroxyl number of about 26.
(2) Solvent was stripped from the stabilizer in Examples 249 and 250 before blending with the polyol. In Example 251, the stabilizer was used without stripping the solvent.

In each Example, as can be seen, the polymer/polyol produced was stable.

EXAMPLES 252–260

These Examples illustrate the physical appearance of the stabilizers of the present invention and their viscosity characteristics.

Table XXXIII sets forth the experimental conditions and results for a series of stabilizers made in toluene from various solvatable and anchor portions:

TABLE XXXIII

| | Example No. | | | | | | | |
|---|---|---|---|---|---|---|---|---|
| | 252 | 253 | 254 | 255 | 256 | 257 | 258 | 259 |
| Preparation (1) | | | | | | | | |
| Solvatable Portion | (2) | (3) | (4) | (2) | (4) | (4) | (4) | (4) |
| Anchor portion, A/S Ratio | 70/30 | 50/50 | 50/50 | 30/70 | 30/70 | 30/70 | 30/70 | 30/70 |
| Anchor portion/Solvatable portion | 40/60 | 51/49 | 54.5/44.5 | 32.4/67.6 | 50/50 | 30/70 | 52/48 | 48/57 |
| Solid Content, % | 33.5 | 43.2 | 44.66 | 29.33 | 51.5 | 30.5 | 40 | 43 |
| Properties | | | | | | | | |
| Appearance of Product (solvent free) | paste | paste | paste | semisolid | semisolid | semisolid | solid | solid |
| Brookfield Viscosity | — | 160,200 cps. | 66,500 cps. | — | — | — | — | — |

(1) The stabilizers of Examples 252 and 256 were prepared by the general technique previously described while the other stabilizers were made using the technique described in connection with Examples 246–251.
(2) Described in Example 247.
(3) Polypropylene oxide triol (b) described Examples 250 and 251.
(4) Polypropylene oxide material V.

As shown, the physical appearance of the stabilizers, all made by the free radical grafting mode, varied from solids or semi-solids (Examples 255–259) when using an anchor portion made with a 30/70 acrylonitrile/styrene monomer ratio to pastes when monomer ratios of increasing acrylonitrile content were employed (Examples 252–254). Also, the viscosities of these stabilizers were well in excess of the viscosities of polymer/polyols prepared from comparable monomer contents.

A further stabilizer was prepared for evaluation, using the technique described in Examples 246–251. The experimental conditions and results are set forth in Table XXXIV:

TABLE XXXIV

| | Example No. 260 |
|---|---|
| Solvatable Portion of Stabilizer | (1) |
| Amount of Solvatable Portion, wt. % in total feed | 24.31 |
| Amount of Solvent (Toluene), wt. % in total feed | 48.62 |
| Catalyst Type | TBPO |
| Catalyst, wt. % in total feed | 1.46 |
| Ratio of Acrlylonitrile to Styrene, wt. % | 50/50 |
| Total Monomer Content, wt. % in total feed | 25.61 |
| Ratio of Vinyl Monomers to Solvatable Portion in Feed | 51.3/48.7 |
| Reaction Temperature, °C. | 130 |
| Toluene + Solvatable Portion + Catalyst Feed Rate, gm/hr | 1255 |
| Monomer Feed Rate, gm/hr | 432 |
| Product Rate, gm/hr | 1672 |
| Material Balance, % | 99.10 |
| Residual Acrylonitrile, % | 4.39 |
| Styrene, % | 3.04 |
| Conversions, Acrylonitrile, % | 66.20 |
| , Styrene, % | 76.47 |
| , Combined, % | 71.24 |
| Total Poly A in Unstripped Product by Calc., wt. % | 9.12 |
| Total Poly S in Unstripped Product by Calc., wt. % | 10.57 |
| Total Polymer in Unstripped Product by Calc., wt. % | 19.69 |
| Ratio of Vinyl Polymer to Soluble Portion by Calc., wt. % | 42.87/57.13 |
| Calculated Hydroxyl No. of Unstripped Product, mg. KOH/gm | 7.47 |
| Total Poly A on (Toluene-Free) Product by Calc., wt. % | 19.86 |
| Total Poly S in Stripped (Toluene-free) Product by Calc., wt. % | 23.01 |
| Total Polymer on Stripped (Toluene-free) Product by Calc., wt. % | 42.87 |
| Ratio of Poly A to Poly S in Product, by Calc., wt. % | 46.3/53.7 |
| Solids (nonvolatiles), wt. % by analysis | 43.82 |
| Solids (nonvolatiles), wt. % by calculation | 45.94 |
| Properties | |
| Appearance | Stable Dispersion |
| Viscosity | 260,000 cps. |

(1) Same as used in Example 253.

In evaluating the stabilizer of Example 260, it was determined by an electron micrograph that the stripped stabilizer was in fact a dispersion. A portion of the stabilizer in the toluene solvent was used to prepare two polymer/polyols, one employing a 30/70 acrylonitrile/styrene monomer system with a monomer content of about 18% in Polyol V and the other using a 40/60 acrylonitrile/styrene system at a monomer content of about 28% in the polyol blend described in Examples 250 and 251. The process used was that described in Examples 119–124; and both polymer/polyols were stable as determined by their viscosity, centrifugible solids level and filtration hindrance characteristics.

The stabilizer of Example 260 was also evaluated to determine whether it behaved similar to a polymer/polyol. A 20/80 blend of the stabilizer with a conventional polyol was compared to a similar blend of a commercially available polymer/polyol by preparing foams from the two blends. While some properties of the resulting foams were somewhat different, the data indicated that the stabilizer behaved like a polymer/polyol in providing a foam with load reinforcement.

What is claimed is:

1. A method for producing a polyurethane by reacting a mixture comprising (A) a polymer/polyol composition and (B) an organic polyisocyanate in the presence of (C) a catalyst for the reaction of (A) and (B) to produce a polyurethane, wherein the polymer/polyol composition (A) is produced by a process which comprises: adding a preformed stabilizer, which is a graft or addition copolymer comprising (a) an anchor portion consisting essentially of a polymer of an ethylenically unsaturated monomer or a mixture of such monomers chemically bonded to (b) a solvatable portion consisting of a propylene oxide polymer having a number average molecular weight of at least about 800, said preformed stabilizer having a viscosity in excess of 40,000 centipoises at 25° C., to a normally liquid polypropylene oxide polyol having a number average molecular weight of at least about 400 and a hydroxyl number of from about 20 to about 280, said preformed stabilizer being present in the polyol in an amount sufficient to stabilize a polymer particle dispersed therein against phase separation, in order to provide a homogeneous mixture of said preformed stabilizer and said polyol, and subsequently polymerizing a reaction mixture comprising (I) said homogeneous mixture of preformed stabilizer and polyol, (II) from about 10 to about 40 weight percent of an ethyleneically unsaturated monomer or a mixture of such monomers, said weight percent being based on the total weight of the monomer or monomer mixture and the polyol in said homogeneous mixture, and (III) a free radical catalyst.

2. A method for producing a polyurethane foam by reacting and foaming a mixture comprising (A) a polymer/polyol composition, (B) an organic polyisocyanate, (C) a catalyst for the reaction of (A) and (B) to produce the polyurethane, (D) a blowing agent, and (E) a foam stabilizer, wherein the polymer/polyol composition (A) is produced by a process which comprises:

adding a preformed stabilizer, which is a graft or addition copolymer comprising (a) an anchor portion consisting essentially of a polymer of an ethylenically unsaturated monomer or a mixture of such monomers chemically bonded to (b) a solvatable portion consisting of a propylene oxide polymer having a number average molecular weight of at least about 800, said preformed stabilizer having a viscosity in excess of 40,000 centipoises at 25° C., to a normally liquid polypropylene oxide polyol having a number average molecular weight of at least about 400 and a hydroxyl number of from about 20 to about 280, said preformed stabilizer being present in the polyol in an amount sufficient to stabilize a polymer particle dispersed therein against phase separation, in order to provide a homogeneous mixture of said preformed stabilizer and said polyol, and subsequently polymerizing a reaction mixture comprising (I) said homogeneous mixture of preformed stabilizer and polyol, (II) from about 10 to about 40 weight percent of an ethylenically unsaturated monomer or a mixture of such monomers, said weight percent being based on the total weight of the monomer or monomer mixture and the polyol in said homogeneous mixture, and (III) a free radical catalyst.

3. The method of claim 2 wherein the foam is a flexible foam, the reaction and foaming are performed by the one-shot technique, and the blowing agent is water, which water is used in an amount to provide a foam having a density of less than about 1.75 pounds per cubic foot.

4. The polyurethane produced by the method of claim 1.

5. The polyurethane foam produced by the method of claim 2.

6. The polyurethane foam produced by the method of claim 3.

* * * * *